US 7,707,564 B2

(12) United States Patent
Marvin et al.

(10) Patent No.: US 7,707,564 B2
(45) Date of Patent: Apr. 27, 2010

(54) SYSTEMS AND METHODS FOR CREATING NETWORK-BASED SOFTWARE SERVICES USING SOURCE CODE ANNOTATIONS

(75) Inventors: Kyle Marvin, Kingwood, TX (US); David Remy, Mercer Island, WA (US); David Bau, Gladwyne, PA (US); Roderick A. Chavez, Kirkland, WA (US); David Read, Bellevue, WA (US)

(73) Assignee: BEA Systems, Inc., San Jose, CA (US)

( * ) Notice: Subject to any disclaimer, the term of this patent is extended or adjusted under 35 U.S.C. 154(b) by 992 days.

(21) Appl. No.: 10/784,492

(22) Filed: Feb. 23, 2004

(65) Prior Publication Data

US 2005/0021689 A1  Jan. 27, 2005

Related U.S. Application Data

(60) Provisional application No. 60/449,958, filed on Feb. 26, 2003.

(51) Int. Cl.
*G06F 9/45* (2006.01)
*G06F 9/44* (2006.01)
*G06F 7/04* (2006.01)

(52) U.S. Cl. .................. 717/140; 717/106; 717/117; 726/21

(58) Field of Classification Search ................ 717/106, 717/110, 114, 117, 120–123, 140
See application file for complete search history.

(56) References Cited

U.S. PATENT DOCUMENTS 5,321,841 A    6/1994  East et al.
5,469,562 A   11/1995  Saether ......................... 714/20
5,604,860 A    2/1997  McLaughlin et al. ........ 715/866
5,630,131 A    5/1997  Palevich et al. .............. 717/108
5,748,975 A    5/1998  Van De Vanter
5,801,958 A    9/1998  Dangelo et al.
5,835,769 A   11/1998  Jervis et al.
5,836,014 A   11/1998  Faiman, Jr.

(Continued)

FOREIGN PATENT DOCUMENTS

CA         2248634 A1      3/2000

(Continued)

OTHER PUBLICATIONS

"The J2EE Tutorial", Sun Microsystems, published Nov. 1, 2001, accessed Nov. 2, 2009 at <http://web.archive.org/web/20011101110752/http://java.sun.com/j2ee/tutorial/1_3-fcs/doc/Security3.html>.*

(Continued)

*Primary Examiner*—James Rutten
(74) *Attorney, Agent, or Firm*—Squire, Sanders & Dempsey, LLP

(57) ABSTRACT

A developer can express the logic offered by a Web service, or other network accessible service, using a standard programming language augmented with declarative annotations specifying preferences for exposing that logic as a Web service. At compile time, an enhanced compiler can analyze the annotated source file and automatically generate the mechanisms required to expose its functionality as a Web service or network accessible service.

25 Claims, 15 Drawing Sheets

U.S. PATENT DOCUMENTS

| | | | |
|---|---|---|---|
| 5,867,822 A | 2/1999 | Sankar | |
| 5,944,794 A | 8/1999 | Okamoto et al. | 709/225 |
| 5,961,593 A | 10/1999 | Gabber et al. | |
| 5,966,535 A * | 10/1999 | Benedikt et al. | 717/147 |
| 6,012,083 A | 1/2000 | Savitzky et al. | 709/202 |
| 6,016,495 A | 1/2000 | McKeehan et al. | 707/103 R |
| 6,018,730 A | 1/2000 | Nichols et al. | 706/45 |
| 6,023,578 A | 2/2000 | Birsan et al. | 717/105 |
| 6,028,997 A | 2/2000 | Leymann et al. | |
| 6,029,000 A * | 2/2000 | Woolsey et al. | 717/147 |
| 6,044,217 A | 3/2000 | Brealey et al. | |
| 6,067,623 A | 5/2000 | Blakley et al. | |
| 6,070,184 A | 5/2000 | Blount et al. | 709/200 |
| 6,092,102 A | 7/2000 | Wagner | |
| 6,119,149 A | 9/2000 | Notani | |
| 6,141,701 A | 10/2000 | Whitney | 710/5 |
| 6,148,336 A | 11/2000 | Thomas et al. | |
| 6,185,734 B1 | 2/2001 | Saboff et al. | |
| 6,199,102 B1 * | 3/2001 | Cobb | 709/206 |
| 6,212,546 B1 | 4/2001 | Starkovich et al. | 709/203 |
| 6,222,533 B1 | 4/2001 | Notani et al. | |
| 6,226,675 B1 | 5/2001 | Meltzer et al. | |
| 6,230,287 B1 | 5/2001 | Pinard et al. | |
| 6,230,309 B1 | 5/2001 | Turner et al. | |
| 6,237,135 B1 | 5/2001 | Timbol | |
| 6,243,737 B1 | 6/2001 | Flanagan et al. | 709/202 |
| 6,292,932 B1 | 9/2001 | Baisley et al. | 717/114 |
| 6,311,327 B1 | 10/2001 | O'Brien et al. | 717/114 |
| 6,330,569 B1 | 12/2001 | Baisley et al. | 707/203 |
| 6,334,114 B1 | 12/2001 | Jacobs et al. | 705/26 |
| 6,338,064 B1 | 1/2002 | Ault et al. | |
| 6,343,265 B1 | 1/2002 | Glebov et al. | 703/25 |
| 6,353,923 B1 | 3/2002 | Bogle et al. | |
| 6,360,358 B1 | 3/2002 | Elsbree et al. | 717/120 |
| 6,367,068 B1 | 4/2002 | Vaidyanathan et al. | |
| 6,377,939 B1 | 4/2002 | Young | 705/34 |
| 6,408,311 B1 | 6/2002 | Baisley et al. | 707/203 |
| 6,411,698 B1 | 6/2002 | Bauer et al. | 370/207.01 |
| 6,445,711 B1 | 9/2002 | Scheel et al. | 370/402 |
| 6,470,364 B1 | 10/2002 | Prinzing | 715/530 |
| 6,516,322 B1 | 2/2003 | Meredith | 707/102 |
| 6,560,769 B1 | 5/2003 | Moore et al. | 717/100 |
| 6,567,738 B2 | 5/2003 | Gopp et al. | |
| 6,584,454 B1 | 6/2003 | Hummel et al. | 705/59 |
| 6,594,693 B1 | 7/2003 | Borwankar | |
| 6,594,700 B1 | 7/2003 | Graham et al. | 709/230 |
| 6,601,113 B1 | 7/2003 | Koistinen et al. | 719/316 |
| 6,604,198 B1 | 8/2003 | Beckman et al. | |
| 6,609,115 B1 | 8/2003 | Mehring et al. | 705/51 |
| 6,615,258 B1 | 9/2003 | Barry et al. | 709/223 |
| 6,636,491 B1 | 10/2003 | Kari et al. | 370/328 |
| 6,637,020 B1 | 10/2003 | Hammond | 717/107 |
| 6,643,652 B2 | 11/2003 | Helgeson et al. | 707/10 |
| 6,654,932 B1 | 11/2003 | Bahrs et al. | 715/507 |
| 6,662,357 B1 | 12/2003 | Bowman-Amuah | |
| 6,678,518 B2 | 1/2004 | Eerola | 455/422.1 |
| 6,684,388 B1 | 1/2004 | Gupta et al. | 717/136 |
| 6,687,702 B2 | 2/2004 | Vaitheeswaran et al. | |
| 6,687,848 B1 | 2/2004 | Najmi | 714/4 |
| 6,721,740 B1 | 4/2004 | Skinner et al. | |
| 6,721,779 B1 | 4/2004 | Maffeis | 709/202 |
| 6,732,237 B1 | 5/2004 | Jacobs et al. | |
| 6,748,420 B1 | 6/2004 | Quatrano et al. | 709/205 |
| 6,754,884 B1 | 6/2004 | Lucas et al. | 717/108 |
| 6,757,689 B2 | 6/2004 | Battas et al. | |
| 6,789,054 B1 | 9/2004 | Makhlouf | 703/6 |
| 6,795,967 B1 | 9/2004 | Evans et al. | |
| 6,799,718 B2 | 10/2004 | Chan et al. | 235/375 |
| 6,802,000 B1 | 10/2004 | Greene et al. | |
| 6,804,686 B1 | 10/2004 | Stone et al. | |
| 6,823,495 B1 | 11/2004 | Vedula et al. | 715/805 |
| 6,832,238 B1 | 12/2004 | Sharma et al. | 709/201 |
| 6,836,883 B1 | 12/2004 | Abrams et al. | 717/140 |
| 6,847,981 B2 | 1/2005 | Song et al. | 707/104.1 |
| 6,850,979 B1 | 2/2005 | Saulpaugh et al. | 709/225 |
| 6,859,180 B1 | 2/2005 | Rivera | |
| 6,874,143 B1 | 3/2005 | Murray et al. | 717/173 |
| 6,889,244 B1 | 5/2005 | Gaither et al. | 709/202 |
| 6,915,519 B2 | 7/2005 | Williamson et al. | 719/313 |
| 6,918,084 B1 | 7/2005 | Slaughter et al. | 715/513 |
| 6,922,827 B2 | 7/2005 | Vasilik et al. | |
| 6,950,872 B2 | 9/2005 | Todd, II | 709/227 |
| 6,959,307 B2 | 10/2005 | Apte | |
| 6,963,914 B1 | 11/2005 | Breitbart et al. | 709/226 |
| 6,971,096 B1 | 11/2005 | Ankireddipally et al. | 718/101 |
| 6,976,086 B2 | 12/2005 | Sadeghi et al. | 709/236 |
| 7,000,219 B2 | 2/2006 | Barrett et al. | 717/107 |
| 7,017,146 B2 | 3/2006 | Dellarocas et al. | 717/106 |
| 7,043,722 B2 | 5/2006 | Bau, III | 717/151 |
| 7,051,072 B2 | 5/2006 | Stewart et al. | 709/204 |
| 7,051,316 B2 | 5/2006 | Charisius et al. | 717/103 |
| 7,054,858 B2 | 5/2006 | Sutherland | 707/4 |
| 7,062,718 B2 | 6/2006 | Kodosky et al. | 715/771 |
| 7,069,507 B1 | 6/2006 | Alcazar et al. | 715/530 |
| 7,072,934 B2 | 7/2006 | Helgeson et al. | 709/203 |
| 7,073,167 B2 | 7/2006 | Iwashita | |
| 7,076,772 B2 | 7/2006 | Zatloukal | 717/147 |
| 7,089,584 B1 | 8/2006 | Sharma | |
| 7,096,422 B2 | 8/2006 | Rothschiller et al. | 715/513 |
| 7,107,578 B1 | 9/2006 | Alpern | 717/124 |
| 7,111,243 B1 | 9/2006 | Ballard et al. | 715/744 |
| 7,117,504 B2 | 10/2006 | Smith et al. | 709/201 |
| 7,127,704 B2 | 10/2006 | Van De Vanter et al. | 717/112 |
| 7,143,186 B2 | 11/2006 | Stewart et al. | 709/245 |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | 705/8 |
| 7,240,331 B2 | 7/2007 | Vion-Dury et al. | 717/117 |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | |
| 2002/0035604 A1 | 3/2002 | Cohen et al. | |
| 2002/0049788 A1 | 4/2002 | Lipkin et al. | |
| 2002/0073236 A1 | 6/2002 | Helgeson et al. | |
| 2002/0073396 A1 | 6/2002 | Crupi et al. | |
| 2002/0078365 A1 | 6/2002 | Burnett et al. | |
| 2002/0083075 A1 | 6/2002 | Brummel et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 * | 11/2002 | Beged-Dov et al. | 709/230 |
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 * | 1/2003 | Bau et al. | 709/330 |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0018963 A1 | 1/2003 | Ashworth et al. | |

| | | | |
|---|---|---|---|
| 2003/0023957 A1 | 1/2003 | Bau et al. |
| 2003/0028579 A1 | 2/2003 | Kulkarni et al. |
| 2003/0041198 A1 | 2/2003 | Exton et al. |
| 2003/0043191 A1 | 3/2003 | Tinsley et al. |
| 2003/0046591 A1 | 3/2003 | Asghari-Kamrani et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0079029 A1 | 4/2003 | Garimella et al. |
| 2003/0084203 A1 | 5/2003 | Yoshida et al. |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2004/0019645 A1 | 1/2004 | Goodman et al. |
| 2004/0040011 A1 | 2/2004 | Bosworth et al. |
| 2004/0078373 A1 | 4/2004 | Ghoneimy et al. |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vaschillo et al. |
| 2005/0278585 A1 | 12/2005 | Spencer |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| WO | WO 99/23558 | 5/1999 |
| WO | WO 00/29924 A | 5/2000 |

OTHER PUBLICATIONS

Erich Liebmann, et al., "Adaptive Data Dissemination and Caching for Edge Service Architectures Built with the J2EE", Mar. 2004, ACM Press, 2004 ACM Symposium on Applied Computing, pp. 1717-1724.
Kunisetty, Workflow Modeling and Simulation Using an Extensible Object-Oriented Knowledge Base Management System. CiteSeer, 1996, pp. 1-60, entire reference.
Van Der Aalst et al, Verification of XRL: An XML-Based Workflow Language, IEEE, July 2001, pp. 427-432, entire reference.
Blake, Rule-Driven Coordination Agents: A Self-Configurable Agent Architecture for Distributed Control, IEEE, Mar. 2001, pp. 271-277, entire reference.
Dahalin et al, Workflow Interoperability Using Extensible Markup Language (XML), IEEE, Jul. 2002, pp. 513-516, entire reference.
International Search Report, PCT/US04/05488, mailed Mar. 1, 2005, 3 sheets.
Int'l Search Report for PCT/US04/05427, Feb. 10, 2005.
Int'l Search Report for PCT/US04/05479, Dec. 3, 2004.
Sosnoski, "XML and Java Technologies: Data Binding, Part 1: Code Generation Approaches—JAXB and More", IBM, Jan. 1, 2003, pp. 1-11; http://www-128.ibm.com/developerworks/library/x-databdopt/index.html.
Chen, et al., "eCo Architecture for Electronic Commerce Interoperabillity", CommerceNet Framework Project, Jun. 29, 1999, © 1999 by CommerceNet, Inc., pp. 1-107.
Embury, S.M., et al., "Assisting the Comprehension of Legacy Transactions", Proceedings of the Eighth Working Conference on Reverse Engineering, Oct. 2-5, 2001, © 2001 IEEE, pp. 345-354.
Mays, E., et al., "A Persistent Store for Large Shared Knowledge Bases", IEEE Transactions on Knowledge and Data Engineering, Mar. 1991, vol. 3, Issue 1, © 1991, pp. 33-41.
Tang, C., et al., "Integrating Remote Invocation and Distributed Shared State", Proceedings of the 18$^{th}$ International Parallel and Distributed Processing Symposium, (IPDPS '04), © 2004 IEEE, Apr. 26-30, 2004, 10 pages.
JAVA Debug Interface-definition, retrieved from <URL http://java.sun.com/j2se/1.4.2/docs/guide/jpda/jdi/overview-summary.html on Feb. 21, 2007, pp. 1-3.
Kilgore, R.A., "Multi-Language, Open-Source Modeling Using the Microsoft.Net Architecture", Proceedings of the Winter Simulation Conference, Dec. 8-11, 2002, © 2006, IEEE, pp. 629-633.
HP, "HP Application Server Developer's Guide, Version 8.0", © 1999-2001, Hewlett-Packard Company, Palo Alto, California, pp. 27-81, 127-160, 195-271.
Supplementary European Search Report, EP02784131.1-1243—PCT/US/0233098, Aug. 8, 2007, 4 pages.
Allamaraju, et al., "Professional Java Server Programing J2EE 1.3 Edition". WROX, XP002442953, ISBN: 1-861005-37-7, Sep. 2001, p. 1009-p. 1057.
Muller, "Event-oriented Dynamic Adaptation of Workflows: Model, Architecture, and Implementation", 2002, University of Leipzig, Germany, pp. i-viv, 1-342.
Pelz, "Web Services Orchestration", Hewlett Packard, Co., Jan. 2003, pp. 1-20.
Ort et al., "Java Architecture for XML Binding (JAXB)", Sun Microsystems, Inc., Mar. 2003, retrieved from <http://java.sun.com/developer/technical/articles/WebServices/jaxb>, pp. 1-14.
Wikipedia (redirected from JAXB), "Java Architecture for XML Binding (JAXB)", Oct. 12, 2007, pp. 1-3.
Shannon, "Java™ 2 Platform Enterprise Edition Specification, v1.3", Sun Microsystems, Inc., Proposed Final Draft Oct. 20, 2000, Chapters 1-11, 170 pages.
Bogunovic, N., "A Programming Model for Composing Data-Flow Collaborative Applications", R. Boskovic Institute, Zagreb, 10000, Croatia, IEEE, Mar. 1999, 7 pages, retrieved Apr. 10, 2007.
Sung, S.Y., et al., "A Multimedia Authoring Tool for the Internet", © 1997 IEEE, pp. 304-308, retrieved Apr. 10, 2007.
Smith, M., et al., "Marching Towards a Software Reuse Future", ACM Ada Letters, vol. XIV, No. 6, Nov./Dec. 1994, pp. 62-72, retrieved Apr. 10, 2007.
Mohan, C., et al., "ARIES: A Transaction Recovery Method Supporting Fine-Granularity Locking and Partial Rollbacks Using Write-Ahead Logging", © 1992, ACM Transactions on Database Systems, vol. 17, No. 1, Mar. 1992, pp. 94-162.
Bea, "Transforming Data Using Xquery Mapper", BEA AquaLogic Service Bus. 2.0 Documentation, 2006, pp. 1-19.
Stylus Studio, "Xquery Mapper", Stylus Studio®, Jun. 5, 2007, pp. 1-6; http://www.stylussstudio.com/xquery_mapper.html.
Altova, "XML-to-XML Mapping", Altova MapForce®, 2007, pp. 1-3.
Jamper, "Jamper-Java XML Mapper", Sourceforge.Net®, Jun. 6, 2007, pp. 1-4; http://jamper.sourceforge.net/xxxxxxxxxxxx.
Microsoft, "Microsoft.net Framework", Microsoft Corporation, 2001, 54 pages.
Willink, "Meta-Compilation for C++", University of Surrey, Jan. 4, 2000, 379 pages.

* cited by examiner

```
ItemList items;                    // each basket will have its own item list /* @Operation
 * @Conversation Start */
void newBasket() { ... }           // creates a new item list /* @Operation
 * @Conversation Continue */
void addItem(Item i) { ... }       // continues an existing conversation
                                   // using the associated item list /* @Operation
 * @Conversation Finish */
void checkout(Payment p) { ... }   // finishes an existing conversation
                                   // and deletes the associated item list /* @Operation
 * @Conversation Finish
 * @buffer */
void cancel() { ... }              // finishes an existing conversation
                                   // and deletes the associated item list /* @Operation */
int activeBaskets() { ... }        // stateless method
                                   // returns number of baskets in use
```

*Figure 2*

```
/**
 * @operation
 */
public String greeting(String firstname, String lastname)
{
    Calendar cal =
        Calendar.getInstance(TimeZone.getDefault());
    SimpleDateFormat sdf =
        new java.text.SimpleDateFormat("yyyy-MM-dd HH:mm:ss");

return "Hello " + firstname + " " + lastname +
           " at " + sdf.format(cal.getTime());
}
```

*Figure 3A*

```
POST /app/mypackage/CreditReport.jws HTTP/1.1
Host: www.company.com
Content-Type: text/xml; charset="utf-8"
Content-Length: 648
SOAPAction: "Some-URI"

<soap:Envelope
 xmlns:soap="http://schemas.xmlsoap.org/soap/envelope/"
 xmlns:cgc="http://bea.com/SOAP/conversation"
 soap:encodingStyle="http://schemas.xmlsoap.org/soap/encoding/"/>
  <soap:Header>
  </soap:Header>
  <soap:Body>
    <m:greeting xmlns:m="http://www.company.com/app/mypackage/CreditReport.jws">
      <firstname>Jane</firstname>
      <lastname>Doe</lastname>
    </m:greeting>
  </soap:Body>
</soap:Envelope>
```

*Figure 3B*

```
HTTP/1.1 200 OK
Content-Type: text/xml; charset="utf-8"
Content-Length: 574

<soap:Envelope
 xmlns:soap="http://schemas.xmlsoap.org/soap/envelope/"
 soap:encodingStyle="http://schemas.xmlsoap.org/soap/encoding/"/>
  <soap:Header>
  </soap:Header>
  <soap:Body>
    <m:greetingResponse
     xmlns:m="http://www.company.com/app/mypackage/CreditReport.jws">
      <result>Hello Jane Doe at 2001-08-15 16:18:04</result>
    </m:greetingResponse>
  </soap:Body>
</soap:Envelope>
```

*Figure 3C*

```
<s:Envelope xmlns:s="http://schemas.xmlsoap.org/soap/envelope/"
 xmlns:c="http://openuri.org/soap/conversation/">
  <s:Header>
    <c:conversationID>4232-133214-3223132:42332-3144-2332251</c:conversationID>
    <c:defaultCallbackURL>
      http://original.com/foo/Callbacks.jwi
    </c:defaultCallbackURL>
  </s:Header>
  <s:Body>
    <!-- contents omitted -->
  </s:Body>
</s:Envelope>
```

*Figure 4*

```
public    interface ServiceInterceptor {
    /**
        * Provides initialization data to the interceptor implementation. This method
      * will be called before any call to "handle" methods.
        * @param config configuration paramaters defined through config      - data annota  tions
      * @param wsdl the definition for this service
    */
      public void init(Map config, XMLInputStream wsdl);

/**
        * The interface called from the knex runtime to allow top       - level
        * containers to interrogate and/or manipulate the incoming XML
        * request. The request respresents the entire payload of the
        * request. This interface is invoked before any paramter        - xml
     * maps are run.
          * @param xmlRequest The request that is targeted to an @operation
     * method.
        * @return an XMLInputS          tream that will be delivered to an @operation
       * method on the current service.
    */
      public XMLInputStream handleRequest(XMLInputStream xmlRequest);

/**
        * The interface called from the knex runtime to allow top       - level
      * containers to interro        gate and/or manipulate the outgoing XML
        * response. The response respresents the entire payload of the
        * response. This interface is invoked after any return       - xml
     * maps have run.
          * @param xmlResponse The response that was generated by an @oper          ation
     * method.
          * @return an InputStream that will be returned to the caller of the
     * service.
    */
      public XMLInputStream handleResponse(XMLInputStream xmlResponse);

/**
        * The interface called from the knex runtime to allow top       - level
        * containers to interrogate and/or manipulate the outgoing XML
        * response. The response respresents the entire payload of the
     * response.
          * @param xmlResponse The response that was generated by an @operation
     * method.
        * @return an InputStr       eam that will be returned to the caller of the
     * service.
    */
      public XMLInputStream handleFault(XMLInputStream xmlFault);

/**
          * Called when the service instance is being removed. After destroy is called,
       * none of the "handle" methods wi     ll be calls.
    */
    public void destroy();
}
```

*Figure 15*

SYSTEMS AND METHODS FOR CREATING NETWORK-BASED SOFTWARE SERVICES USING SOURCE CODE ANNOTATIONS

CLAIM OF PRIORITY

This application claims priority from the following application, which is hereby incorporated by reference in its entirety:

U.S. Provisional Application No. 60/449,958, entitled "Systems and Methods for Creating Network-Based Software Services Using Source Code Annotations" by Kyle Marvin, et al., filed Feb. 26, 2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the creation of network-accessible services, such as Web services.

BACKGROUND

There is a rapidly expanding industry emerging around Web services, a term loosely defined as the ability to share software as a service using network protocols. Web services and other network accessible software services require significant time. As the Web service infrastructure evolves, it is becoming increasingly complicated, requiring more time, skill, knowledge and ultimately money to create Web services. Consequently, the generation and deployment of Web services is increasingly tedious and unnecessarily complicated for the average developer. Currently, in addition to developing the software logic offered via the Web service, developers are also required to address a number of tedious and complex issues involving Web service generation and deployment. Examples of such issues include but are not limited to, security, reliable messaging and message pre/post processors (a.k.a. interceptors).

It is not uncommon for Web services to require several forms of security simultaneously. The creation and deployment of secure Web services and other software services made available over networks is a complex and time consuming process for both software developers and system managers.

Reliable messaging is often required for Web services, but yet is not inherent in the protocols typically used. Reliable messaging is implemented on both the client and the server and will generally support a callback path, used in the event of a failure. Thus, developers require considerable specialized knowledge and time to develop, test, and deploy reliable messaging schemes.

In many practical Web services implementations and system integrations, it is necessary to manipulate both incoming and outgoing network messages with message pre/post processors. These manipulations can include transformation of message headers and contents, logging, auditing, message redirection, and protocol conversions.

BRIEF DESCRIPTION OF THE DRAWINGS

FIG. 2 illustrates an exemplary source code augmented with meta-data annotations in accordance with one embodiment of the invention FIGS. 3A-C illustrate exemplary source code for binding of wire protocol in accordance with one embodiment of the invention.

FIG. 4 illustrates an exemplary source code for a conversation ID header in accordance with one embodiment of the invention.

FIG. 15 shows an exemplary interceptor API, which may be used in implementing some embodiments of the invention.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods in accordance with the present invention can provide a flexible and extensible platform that simplifies the task of developing Web services, or other network accessible services, by allowing Web service developers to focus on developing the logic of the Web service rather than implementation and deployment particulars. In some embodiments of the present invention, the developer expresses the logic offered by the Web service using a standard programming language augmented with declarative annotations specifying preferences for exposing that logic as a Web service. At compile time, an enhanced compiler can analyze the annotated source file and automatically generate the mechanisms required to expose its functionality as a Web service or network accessible service. Because the annotations are declarative, they may be easily visualized, created, and modified using a graphical user interface, further simplifying the developer's task. Thus, such an approach decreases the time, knowledge, skill and ultimately cost required to develop the complex support required to proved services in these environments.

Figure 1:
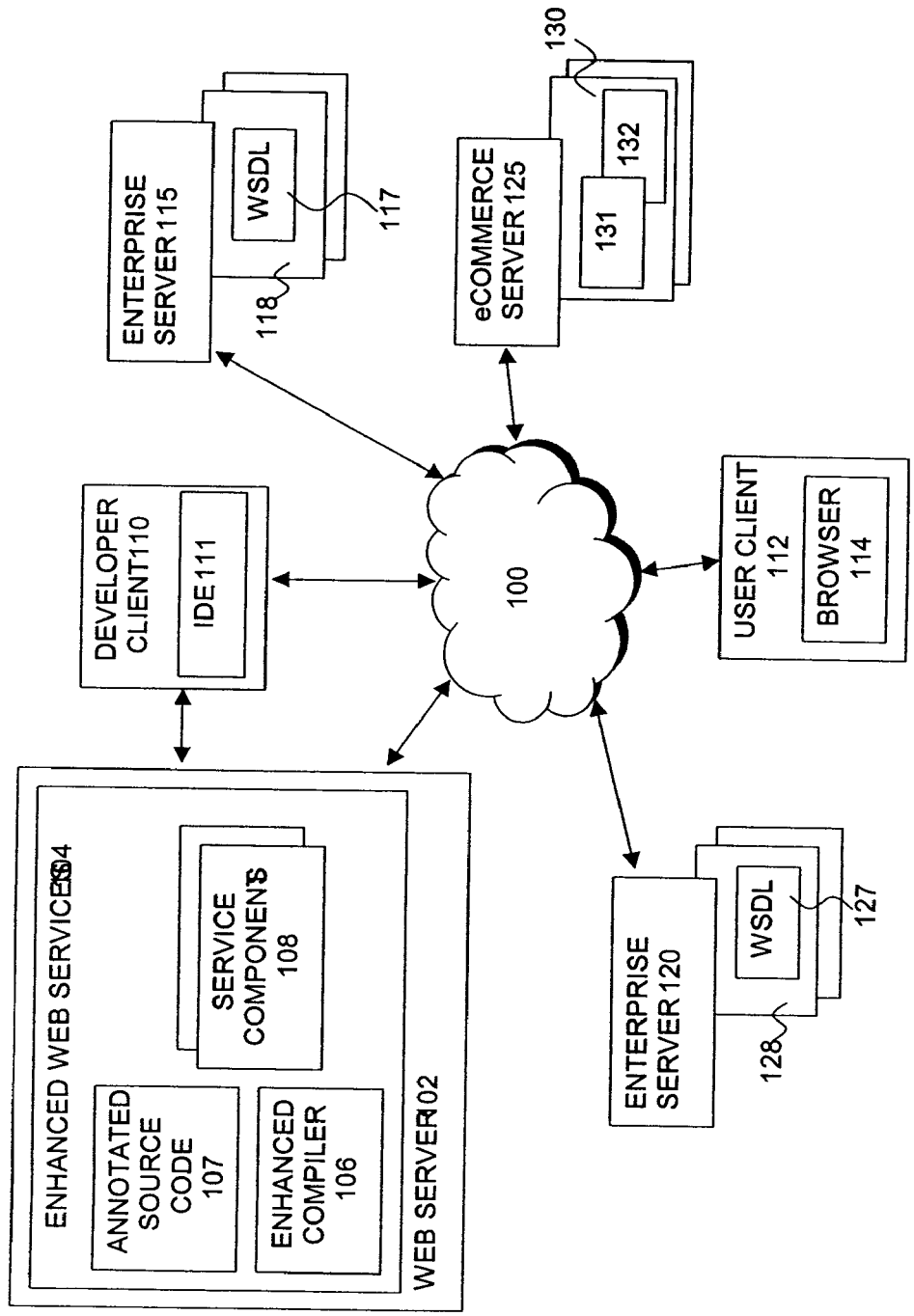
FIG. 1 is a diagram showing an exemplary network-based software service system that can be used in accordance with one embodiment of the present invention.

FIG. 1 illustrates an overview of one embodiment of the present invention within the context of an example network of Web service providers and consumers. In FIG. 1, Web server 102, developer client 110, enterprise servers 115 and 120, user client 112 and eCommerce Web server 125 are communicatively coupled together through networking fabric 100 as illustrated. Networking fabric 100 represents one or more interconnected data networks, such as the Internet or World Wide Web, that are equipped to employ one or more well-known communication protocols such as the hypertext transfer protocol (HTTP).

Web server 102 represents one or more computing devices equipped with enhanced Web services 104 of the present invention to provide conversational and asynchronous Web services to remote clients, such as user client 112 as well as enterprise servers 115 and 130, which are communicatively coupled to networking fabric 100. Enhanced Web services 104 can include an annotated source code 107, an enhanced compiler 106, and various deployed service components 108. As will be discussed in further detail below, when annotated source code 107 is compiled by enhanced compiler 106, the compiler generates one or more object files, software components and deployment descriptors to facilitate the automated deployment of Web service components 108. In the illustrated embodiment, developer client 110 represents a computing device equipped with integrated development environment (IDE) 111 to facilitate graphical interface-based design and development of enhanced Web services 104 by a developer. In place of, or in addition to being communicatively coupled to Web server 102 through networking fabric 100, developer client 110 can be coupled directly (e.g. via a local area network) to Web server 102 as shown. Furthermore, rather than being installed on an external client device such as developer client 110, IDE 111 may instead be collocated with enhanced Web services 104 on Web server 102 without departing from the spirit and scope of the invention.

Enterprise servers 115 and 120 represent publicly accessible servers belonging to one or more organizations that have published Web service components 118 and 128 with associated Web service description files 117 and 127, respectively. In the illustrated embodiment, Web service description files 117 and 127 represent XML-based Web service description language (WSDL) files that advertise the capabilities of Web service components 118 and 128 to devices coupled to networking fabric 100 including user client 112 and Web server 102.

User client 112 represents a general-purpose computer system such as, but not limited to a desktop computer, laptop computer, palmtop computer, network appliance, a personal digital assistant (PDA), and so forth, equipped with Web browser 114. In the illustrated embodiment, user client 112 accesses (e.g. via networking fabric 100) Web page(s) 130 hosted by eCommerce server 125. Web pages 130 may include content 131, such as merchandise descriptions, reviews and pricing information, as well as one or more Web functions 132. When executed, Web functions 132 may send requests to Web server 102 causing one or more service components 108 to be executed, which in turn may send one or more requests to enterprise servers 115 and 120 causing one or more remote components 118 and/or 128 to further be executed.

For example, assume Web page(s) 130 displays merchandise that is offered for sale by a given online merchant via eCommerce Web server 125. Web function(s) 132 may request various functions of a shopping cart service provided by Web server 102 including an "add an item to cart" function, a "remove an item from cart" function, and a "checkout" function. By selecting a button graphically displayed on Web page(s) 130 for example, a user may cause one or more requests for shopping cart functions to be generated. This in turn may cause one or more of service components 108 to be remotely executed on Web server 102 via e.g. the well-known Simple Object Access Protocol (SOAP). In the illustrated example, the initiation of a checkout function by user client 112 may cause Web server 102 to communicate with enterprise servers 115 and/or 120 to obtain one or more credit authorizations for use by the online merchant in completing the user's purchase transaction. In one embodiment, Web server 102 communicates with enterprise server 115 and/or 120 based upon their public interfaces advertised by WSDL files 117 and/or 127. Once enterprise servers 115 and/or 120 provide Web server 102 with the solicited credit information, server components 108 can perform a variety of actions depending upon the particular Web logic deployed.

In the above example, enhanced Web services 104 processed a single shopping cart transaction pertaining to a single user client. More often, however, Web services are required to process numerous simultaneous transactions while maintaining state associated with each transaction. In the shopping cart Web service for example, each user client will use a separate shopping basket, each containing a separate list of items. Each user client will request a new shopping cart, add items to the shopping cart, remove items from the shopping cart, and finally check out or cancel the operation. Thus, the Web service needs to keep track of all the shopping lists and ensure that each incoming client request (e.g. new, add, remove & check-out) is applied to the correct list. Furthermore, each credit authorization request needs to be correlated with the correct user so as to avoid mistaken authorizations. Therefore, it should be apparent that as the number of users and associated transactions increase, the need to efficiently manage conversations (i.e. correlate multiple requests and responses) and the associated state becomes increasingly important. Accordingly, the present invention automatically generates code to manage state associated with multiple, simultaneous conversations. Similarly, because external Web services (i.e. such as those offered by enterprise servers 115 and 120) are not always designed to respond to the initiating Web service immediately, the present invention further provides the automatic generation of code for managing one or more asynchronous transactions where for example, responses may be temporally separated from the initiating request and arrive on a separate connection.

In one embodiment, enhanced compiler 106 compiles programming language source code that has been augmented with declarative annotations specifying preferences for exposing programming logic as a Web service. At compile time, enhanced compiler 106 analyzes the annotated source file and automatically generates the mechanisms necessary to expose its functionality as a stateful and/or asynchronous Web service based at least in part upon the annotations.

At run time, enhanced Web services 104 of the present invention receives messages from remote clients requesting that one or more Web service methods be invoked. Enhanced Web services 104 parses each message to identify the method being called and dispatches the request to one or more of service components 108 depending upon whether the requested method comprises a stateless or stateful request for example.

In some embodiments in accordance with the present invention, IDE 111 facilitates graphical interface-based Web service design and development. Using IDE 111 for example, a developer is able to graphically associate remote clients, external services, Web methods, and so forth, with the Web service logic being designed. Additionally, using IDE 111 a developer is able to identify which methods (if any) should be buffered, which methods should be asynchronous, which methods should be stateful, and which methods are to cause a non-isomorphic mapping between incoming message elements and native language objects for example. Furthermore, once a method has been added to the Web service (e.g. via graphical manipulation by the developer), IDE 111 provides the developer with the ability to further define and/or modify the method by specifying one or more parameters and/or attributes. For example, if a developer drags a method indicator to graphically connect the current Web service to the client, a dialog may be displayed to enable the developer to declare a method name, member variable names, variable types, expected return types and so forth. Similarly, if a developer graphically associates an external service with the Web service under development, the developer may be provided the opportunity to import a description file for the Web service, such as WSDL file 117 or 127.

In one embodiment, IDE 111 automatically annotates the Web service source code with declarative meta-data based upon graphical and/or textual input provided by the developer through one or more interfaces of IDE 111. In one embodiment, enhanced compiler 106 utilizes the meta-data annotations during compilation of the source code to facilitate generation of stateful and asynchronous Web services. For example, if a developer graphically identifies a method as being buffered (e.g. by dragging an icon representing a buffer onto or near the associated graphical representation of a method), IDE 111 annotates the associated method within the source code with meta-data to indicate to enhanced compiler 106 that the method is to be buffered. During compilation, enhanced compiler 106 recognizes the method as being buffered based at least in part upon the meta-data annotations, builds one or more class files (and potentially additional support files) and deploys them to server 102 to buffer incoming requests for that method accordingly.

In one embodiment, a developer using IDE 111 is able to toggle between various screen views including a graphical design view, and a source view. In accordance with one embodiment of the invention, using the source view a developer can manually enter meta-data annotations directly within the source code to identify those portions of the source code that are to be exposed as Web services.

As the developer interacts with IDE 111 to specify a Web service, IDE 111 contemporaneously creates directories on Web server 102, into which various files, including the Web service source code file and imported Web service description files, are stored. In one embodiment, IDE 111 attaches a "*.jws" extension to the Web service source code filename, which is then stored in a publicly accessible project directory on Web server 102. In one embodiment, Web server 102 is configured to redirect client requests for this file to a servlet for processing instead of returning the contents of the file to the client. IDE 111 may communicate with Web server 102 to create such files and directories via networking fabric 100 using one or more network protocols such as the file transfer protocol (FTP).

As previously mentioned, source code files can be augmented by adding (whether automatically by IDE 111 or manually by the developer) meta-data annotations to the source code files to describe which portions of the source files are to be exposed as Web services and to control implementation details, such as wire protocol preferences. In one embodiment, meta-data annotations are placed within a comment field immediately preceding the statement or declaration the annotation will operate on. In one embodiment of the invention, meta-data annotations include one or more symbols and/or keywords defined by an extended syntax known to the compiler. In the illustrated embodiment, a keyword preceded by a '@' symbol indicates to enhanced compiler 106, which is equipped to recognize such a symbol/keyword combination or derivation thereof based upon the extended syntax, that the associated source code is to be exposed as part of the Web service.

In one embodiment, compiler 106 has been enhanced to recognize numerous such meta-data annotations. In one embodiment, enhanced compiler 106 recognizes meta-data annotations that indicate whether an associated method is stateful, and if so, whether the method applies to the start of a conversation (i.e. a "start" method) between a specific client and Web server 102, a continuation of a conversation (i.e. a "continue" method), or the completion of a conversation (i.e. a "finish" method). In one embodiment, stateful annotations cause enhanced compiler 106 to generate one or more persistent components to maintain conversational state relating to the associated method. In one embodiment, enhanced compiler 106 automatically generates one or more Enterprise Java beans (such as an entity bean) as well as associated deployment descriptors to store and manage such conversational state. In one embodiment, each time a start method is invoked at run-time, a new instance of a conversation is created, and a unique identifier is associated with that conversational instance by a persistent component to facilitate management of multiple simultaneous conversations. In one embodiment, a client requesting a conversational start method generates a unique identifier that is used for each subsequent transaction between that client and the Web service until a finish method is called. In one embodiment, the identifier is passed between the client and Web service by way of a SOAP based message header.

In addition to conversational annotations, in one embodiment enhanced compiler 106 also recognizes meta-data annotations indicating whether an associated method should be buffered to reliably handle a large number of simultaneous requests at peak usage times. In one embodiment, compilation of source code containing buffered annotations causes enhanced compiler 106 to instantiate one or more queues to temporarily store one or more associated requests such that they may be processed in order of arrival when server 102 has resources free to process them. In one embodiment, enhanced compiler 106 utilizes one or more Enterprise JavaBeans™ (such as a message driven bean) to dispatch queued requests.

FIG. 2 illustrates example source code augmented with meta-data annotations in accordance with one embodiment of the invention. As shown, the example source code of FIG. 2 represents five methods (206-210) preceded by associated meta-data annotations (201-205) respectively. Methods 206-209 represent conversational methods as identified by the presence of the @CONVERSATION annotation in 201-204 respectively, whereas method 210 represents a stateless method because it does not have the @CONVERSATION annotation. Method 209 is a buffered method as indicated by the use of "@BUFFER" within annotations 204. In one embodiment, the "@OPERATION" annotation causes enhanced compiler 106 to expose (i.e. make publicly accessible) the functionality of the method immediately following the annotation over the network using protocols such as HTTP and SOAP. Similarly, the "@CONVERSATION START", "@CONVERSATION CONTINUE", and "@CONVERSATION FINISH" meta-data annotations indicate to enhanced compiler 106 whether to start a new stateful conversation, continue an existing conversation, or end an existing conversation, respectively.

Although in the illustrated embodiment, each conversational annotation is preceded by an @OPERATION annotation, other embodiments may not require such a construct. For example, the @OPERATION annotation may be inferred from the @CONVERSATION annotation or other characteristics of the source code (e.g., modifiers such as public, private and static). Moreover, the various meta-data annotations described herein represent a subset of meta-data annotations that enhanced compiler 106 is equipped to recognize. Accordingly, the present invention should not be read as being limited to only those meta-data annotations described. Furthermore, it should be noted that any convenient meta-data annotation syntax could be utilized so long as the compiler is equipped to recognize such an extended syntax. In addition, it should be noted that the meta-data need not be communicated to the compiler using source file annotations, but could instead be communicated using e.g. a separate file. For example, the enhanced compiler could be programmed to read meta-data from a specially formatted XML file with the same name as the source file, but with a different file extension without departing from the spirit of the invention.

It is not always desirable or possible for Web services to return a response to a particular request immediately. Some Web services, called asynchronous Web services, are designed to return one or more responses temporally separate from the associated original requests. In one embodiment, developers may declare asynchronous responses to clients inside an inner interface called Callback. For example,

```
public static interface Callback {
    /* @Operation
     * @Conversation Finish */
    void returnResult(String s);
}
```

Developers can initiate asynchronous responses using a member variable declared of type Callback as follows:
    Callback client;

When enhanced compiler 106 encounters the Callback interface and associated member variable declaration, it automatically generates code to create a client proxy object that implements the declared Callback interface for returning asynchronous responses and assigns it to the declared member variable. For example, the Web service developer could generate the asynchronous response declared above using the following line of code:
    client.returnResult("It worked!");

The client proxy object, including the callback address and a conversation identifier, is stored as part of the conversational state of each Web service instance to associate each callback with the appropriate client instance.

Annotated source code can further define bindings that specify how the client interface is bound to physical wire formats and protocols. In one embodiment, each service interface can have multiple service bindings for different protocols. In one embodiment, supported service bindings include (but are not limited to) SOAP over HTTP, SOAP over SMTP, generic HTTP Post of XML, transport of XML over other protocols such as FTP and mail, transport of XML over Java Messaging Service (JMS) or Microsoft Message Queuing Services (MSMQ), connection to proprietary protocols and so forth. In one embodiment, information about service interfaces and protocol bindings can be exported via WSDL files.

In one embodiment, the method invoked by Web server 102 can be inferred from the data sent over the wire protocol and other meta-data as is illustrated by FIGS. 3A-C. For example, in FIG. 3A, the signature of the 'greeting' method has two parameters, labeled firstname and lastname. Incoming SOAP messages containing an appropriately qualified <greeting> element in the message body and having child elements <firstname> and <lastname> as shown in FIG. 3B should cause this method to be invoked at run time. Enhanced Web Services 104 will parse the request illustrated in FIG. 3B, find the destination object based on the URL/app/mypackage/CreditReport.jws, create String objects based on the <firstname> and <lastname> elements, and pass them as parameters to the "greeting" method based on the <greeting> element. Similarly, Enhanced Web Services 104 will use the return value of the greeting method to generate an HTTP SOAP response such as that illustrated by FIG. 3C.

As was previously mentioned, in one embodiment, the annotated meta-data of the present invention facilitates access to external services (such as service components 118 and 128) by enhanced Web services 104. In one embodiment, enhanced compiler 106 detects one or more annotated member variable declarations representing external services, finds the associated service definition files, automatically generates and assigns proxy objects designed for interacting with the external services, and automatically generates and associates code to handle asynchronous responses from those services. In one embodiment, enhanced compiler 106 scans a provided classpath for one or more service definition files (e.g., WSDL files) matching the classnames of the annotated member variables and automatically generates proxy objects based on the service description. This enables the Web service developer to interact with the external Web service as if it was a local Java object. For example, the declaration

```
/* @Service */
public Bank mybank;
``` would allow the developer to use the bank service like this:
    float balance=mybank.getBalance( );

In this case, the mybank proxy object generated by enhanced compiler 106 would send a request to the remote Bank service using the address, protocol and format information in the Bank.wsdl file found on the classpath. At run time, the code generated by enhanced compiler 106 will automatically instantiate one proxy object for each of the "@Service" annotations found within the source code as shown above.

A service description file associated with an external service may indicate it has stateful conversation methods. In this case, each proxy object generated for interacting with those services will include code to generate and store a unique identifier for the associated conversational instance of the external service. The proxy object will use this unique identifier when generating the conversational message headers stipulated by the external service (see "Conversational Message Headers" below).

Each proxy object, including a unique identifier if present, can be stored as part of the state of the service in development. This effectively associates each instance of the service in development with the appropriate instances of external services.

External services do not always return a response immediately. Accordingly, enhanced compiler 106 automatically generates software for receiving asynchronous responses, associating the responses with the appropriate conversational state, and processing the responses with user defined code.

In accordance with the teachings of the present invention, an asynchronous Web service declares its asynchronous responses as "out methods" in it's associated service description (e.g., WSDL) file. Out methods can be viewed as remote callbacks, i.e., remote functions the asynchronous Web service invokes to return the result associated with an earlier request back to the caller. Software generated by the enhanced compiler of the present invention will pass these asynchronous responses to specially named member functions as may be defined by the developer. In one embodiment, these member function names are formed by appending the name of the asynchronous out method to the name of its local proxy object. For example, to handle a creditCheckResponse( ) out method of the Bank service defined above, the developer would generate a function of the following form:

public void mybank_creditCheckResponse(String result)
      { . . . }

The external proxy object generated by enhanced compiler 106 will add a reply-address to the associated request and listen at that address for the resulting creditCheckResponse( ) message from the mybank service. In one embodiment, if the asynchronous request is part of a stateful conversation, the proxy object generated by the enhanced compiler will generate and use the appropriate unique identifier to correlate the asynchronous response with the correct conversation state prior to invoking mybank_creditReportResponse( ).

In one embodiment, the conversational aspect of the present invention is facilitated through the use of message headers that help maintain conversational state throughout the lifetime of the conversation. In one embodiment of the invention, one or more of a conversation ID header, a default callback location header, and an echoed conversation ID are utilized to maintain conversational state. For example, FIG. 4 illustrates a conversation ID header and a callback location header within a SOAP message from the client to the server. The echoed conversation ID is utilized in responses from the server to the client.

In one embodiment, the conversation ID represents a unique string that is generated by the originator of the first message of the conversation. The conversation ID may include any structure so long as it is globally unique. In one embodiment, the client generates a globally unique identifier (GUID), which is then encapsulated in a SOAP header, however, Uniform Resource Locators (URLs), timestamps, and other unique objects can be used to generate a unique identifier in lieu of the GUID. In one embodiment, the client embeds its own instance identifier as part of the conversation ID so asynchronous callbacks from the server that include the conversation ID can be used to route the callback to the appropriate client instance. In addition, if the first message of the conversation returns a synchronous response, the server can generate the GUID and return it to the client as part of the response. When "continue" or "finish" methods are sent as part of a conversation (either from the client to the server or from the server to the client), the same conversation ID that was established in the start message is echoed verbatim. In one embodiment, the callback location represents an arbitrary URL indicating where the client involved in the conversation is listening for callbacks from the Web service. In one embodiment, the callback location header can appear in association with any start, continue or finish method.

Figure 5:
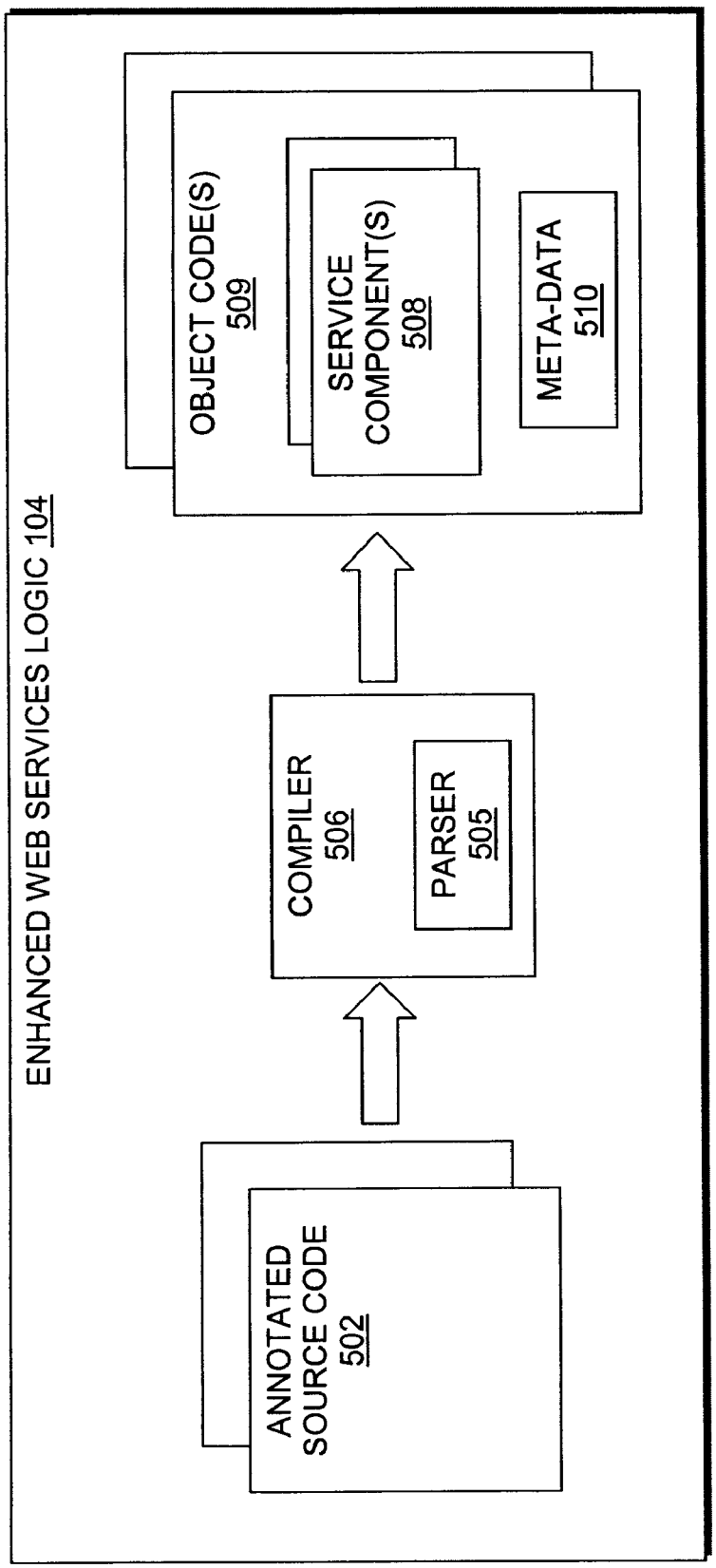
FIG. 5 illustrates an exemplary graphical programmatic flow diagram of enhanced Web services in accordance with one embodiment of the invention.

FIG. 5 illustrates a graphical programmatic flow diagram of enhanced Web services 104, in accordance with one embodiment of the invention. In the illustrated embodiment, one or more annotated source code files 502 are provided to enhanced compiler 506 to be compiled into one or more object code files 509, defining one or more executable service components accessible by remotely connected clients. In one embodiment, annotated source code files 502 represent one or more Java-based files that have been augmented with metadata annotations in accordance with one embodiment of the invention to facilitate simplified Web service development and deployment. Although in the illustrated embodiments, annotated source code files 502 are described as being Java based, they can nonetheless represent a variety of programming languages known in the art, such as C++ and ECMAScript.

Once compiler 506 receives annotated source code files 502, parser 505 reads and parses programming statements contained within the source code. In one embodiment, compiler 506 is enhanced to recognize annotations based on an extended syntax for specifying functionality of the source file to be deployed as a Web service. Accordingly, as parser 505 parses the annotated source code, it identifies the presence and composition of embedded annotations based on this extended syntax. In one embodiment of the present invention, compiler 506 infers by way of the source code annotations the interface of the Web service that is to be exposed to remote clients, the interface of services that will be called by the runtime to be created by compiler 506, as well as internal storage requirements and persistence behavior of the Web service.

During the parsing of annotated source code 502, parser 505 identifies the object types used in the code and attempts to locate definitions corresponding to each type. For example, if a variable "b" of type "Bank" is declared, parser 505 determines whether an object or library file defining the "Bank" type already exists within a given set of directories (e.g., as created by IDE 111 on Web server 102). If an object or library file does not exist, parser 505 determines whether a source file exists that could be run through compiler 506 to generate an object file. Similarly, if neither an object file, library file, nor a source file exists, parser 505 determines whether a Web service description (e.g., WSDL) file exists that could be used by compiler 506 to generate an object file implementing a proxy object for interacting with the associated Web service. In accordance with one embodiment of the invention, if an object file is determined not to exist, parser 505 walks through an ordered list of file types so as to identify a file that could be used in generating the requisite object file.

In one embodiment, compiler 506 generates one or more object files defining publicly accessible service components 508 that may be executed by one or more remote clients. In addition, compiler 506 generates meta-data 510 based on annotated source code 502 and associates it with object codes 509 and service components 508. In one embodiment, metadata 510 includes descriptions of the annotations, methods, member variables, external services and callback interfaces associated with the service. Once compiler 506 has compiled annotated source code 502 into executable code, the code is then provided to an execution engine (not shown) that controls the execution of the code (by e.g. a processor), and performs conventional execution runtime services, such as memory allocation request and release, error/exception handling, and so forth. For the illustrated embodiment, compiler 506 includes an application programming interface (API) (not shown), through which programming statements contained within annotated source code 502 may be programmatically submitted for compilation by a variety of application-specific processes. For example, in accordance with one embodiment of the present invention, Web server 102 makes calls to enhanced Web services 104 upon receiving SOAP encapsulated XML method invocations via networking fabric 100.

Figure 6:
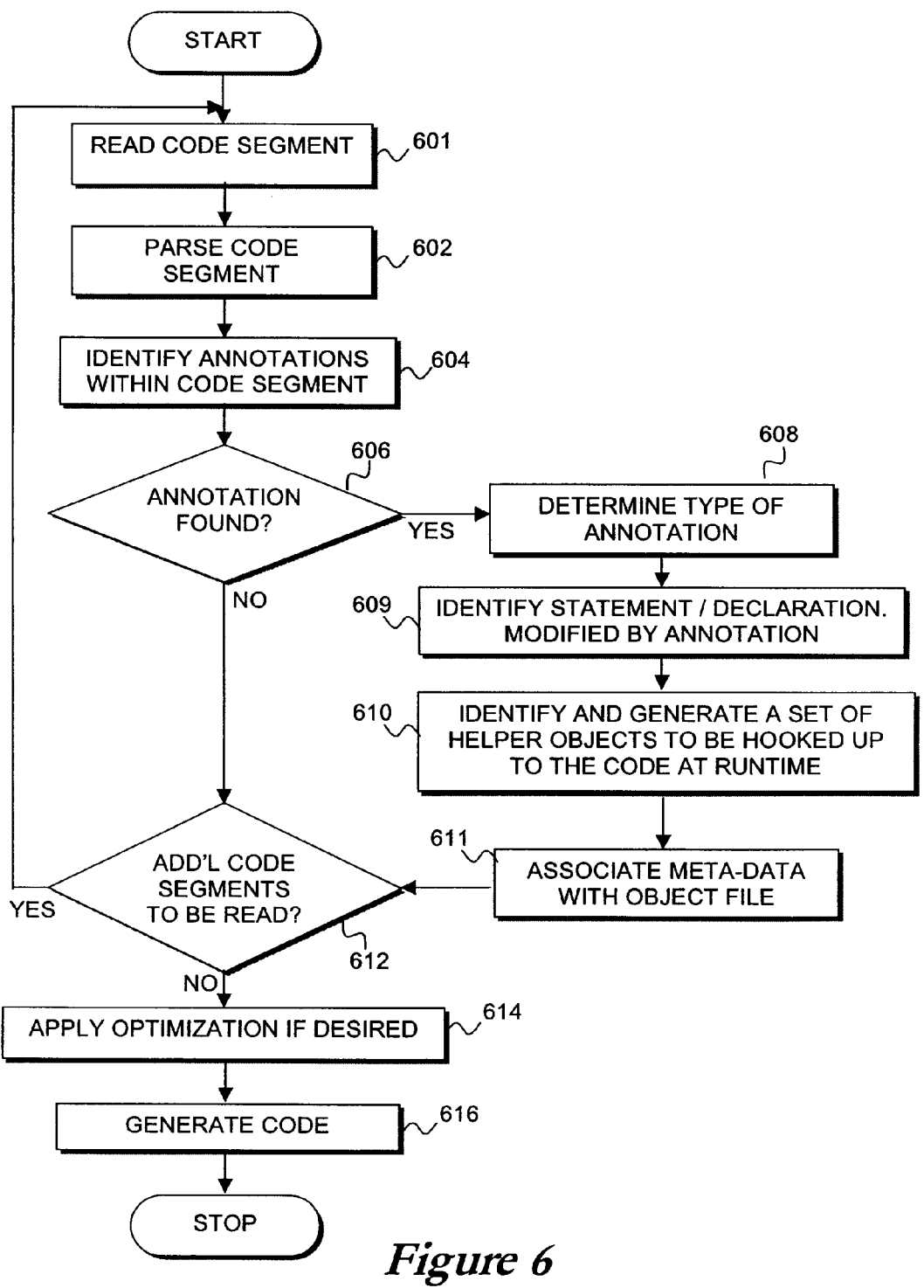
FIG. 6 illustrates an exemplary operational flow of compiler in accordance with one embodiment of the invention.

FIG. 6 illustrates an example operational flow of compiler 506 in accordance with one embodiment of the invention. In operation, compiler 506 first reads a segment of code from annotated source code 502, block 601. Using any one of a number of parsing techniques known in the art, parser 505 then parses the code segment read to identify one or more annotations contained therein based upon a language dictionary or grammar maintained by compiler 506 (blocks 602 & 604). If an annotation is found, compiler 506 determines the annotation type (e.g. conversational, asynchronous, and so forth), block 608, identifies the statement or declaration it modifies, block 609, identifies and generates a set of helper objects to be hooked up to the object file being compiled at runtime, block 610, and associates meta-data extracted from the annotations with the object file, block 611. If an annotation is not found within the code segment, or after the helper objects have been generated as the case may be, compiler 506 continues to read code segments and evaluate expressions until all code have been read and parsed, block 612. Moreover, compiler 506 may optionally apply one or more optimizations to the expressions analyzed, block 614. The optimizations may be any one or more of the applicable compiler optimization techniques known in the art. Finally, with or without optimizing the commands analyzed, at block 616, compiler 506 generates executable code for the expressions analyzed. In one embodiment, compiler 506 generates byte codes for the expressions analyzed. In alternate embodiments, other equivalent "code generation" approaches may be practiced instead.

Figure 7:
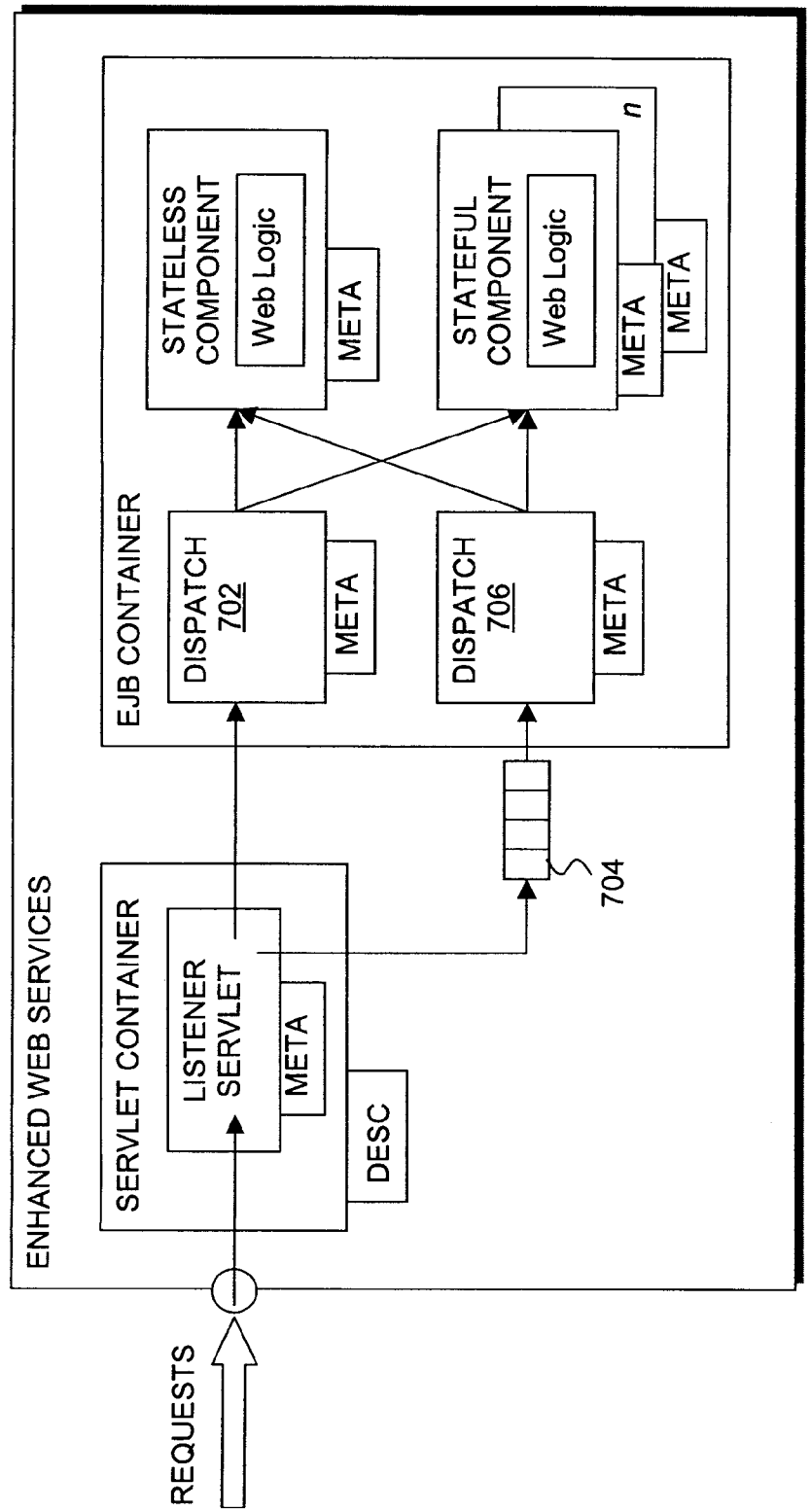
FIG. 7 illustrates an exemplary Web service component resulting from the compilation of one or more annotated source code files in accordance with one embodiment of the invention.

Compilation of the annotated source code by enhanced compiler 106 causes one or more object files, software components, and deployment descriptors to be generated so as to facilitate the automated deployment of the Web services. FIG. 7 illustrates a conceptual Web service component resulting from the compilation of one or more annotated source code files in accordance with one embodiment of the invention.

The Web service component of FIG. 7 includes a servlet container and an Enterprise JavaBean (EJB) container. The servlet and EJB containers are communicatively coupled together for the dispatch of Web service requests. In the illustrated embodiment, the servlet container listens for requests received on a designated communication port, and uses deployment descriptors (DESC) to identify which servlet should respond to the request. In one embodiment, all requests for files with a ".jws" extension are routed to the listener servlet. In one embodiment, the listener servlet uses the URL of the request to determine which Web service should receive the request and identify the location of associated meta-data (META) 510 (e.g., stored in the class file) previously generated by enhanced compiler 506.

In one embodiment of the invention, when the enhanced compiler compiles the annotated source code files, it builds and deploys one or more EJBs depending upon the constitution of the code. At a minimum, the enhanced compiler builds and deploys at least one dispatch component (702) to service messages forwarded from the servlet container. If the enhanced compiler identifies that the Web service has at least one buffered method, the enhanced compiler generates a queue structure (704) in addition to deploying a message driven bean to service the queue. Similarly, if the particular Web service contains stateless methods the enhanced compiler deploys a stateless session bean to handle requests for those methods. In addition, if the Web service contains stateful methods, the enhanced compiler will deploy an entity bean to manage conversational state associated with each service instance. Dispatch components 702 and 706 use meta-data (META) 510 generated by enhanced compiler 506 to determine whether the requested method is stateful or stateless and deploy it to a stateful or stateless component as appropriate. If the requested method is stateful, dispatch components 702 and 706 further use meta-data (META) 510 to determine whether the method is a start method, continue method or finish method, and creates a new stateful instance or looks up a previously created instance as appropriate (see discussion of FIG. 9 below).

Figure 8:
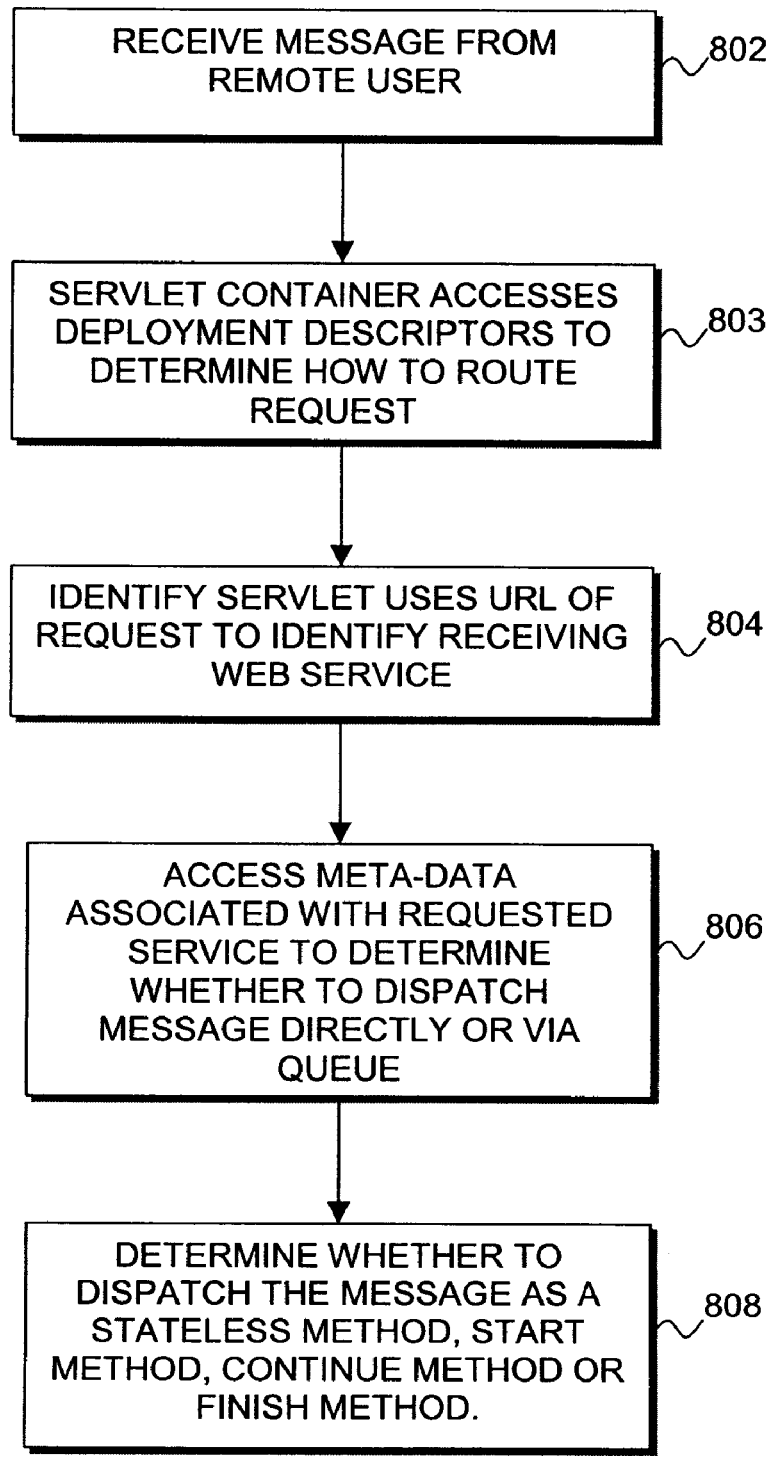
FIG. 8 illustrates one embodiment of a runtime operational flow of the enhanced Web service component of FIG. 7.

FIG. 8 illustrates one embodiment of a runtime operational flow of the enhanced Web service component of FIG. 7. To begin, Web services 104 receive a message over networking fabric 100 from a remote device such as user client 112 (802). In one embodiment, the message is a SOAP encapsulated Web service request transmitted via HTTP. Once the message is received, the servlet container extracts the SOAP request from the HTTP message and utilizes associated deployment descriptors to determine how to direct the request (803). For example, the deployment descriptors may state that all requests identifying a Web service having a predetermined filename extension such as "*.jws" are to be routed to the listener servlet for further dispatch. In one embodiment, the listener servlet then uses the request URL to identify the receiving Web service (804) and accesses the associated meta-data 510 generated earlier by enhanced compiler 506 to determine whether to dispatch the message directly or via a queue (806). One of dispatchers 702 and 706 further access meta-data 510 to determine whether to dispatch the message as a stateless method, start method, continue method or finish method (808).

Figure 9:
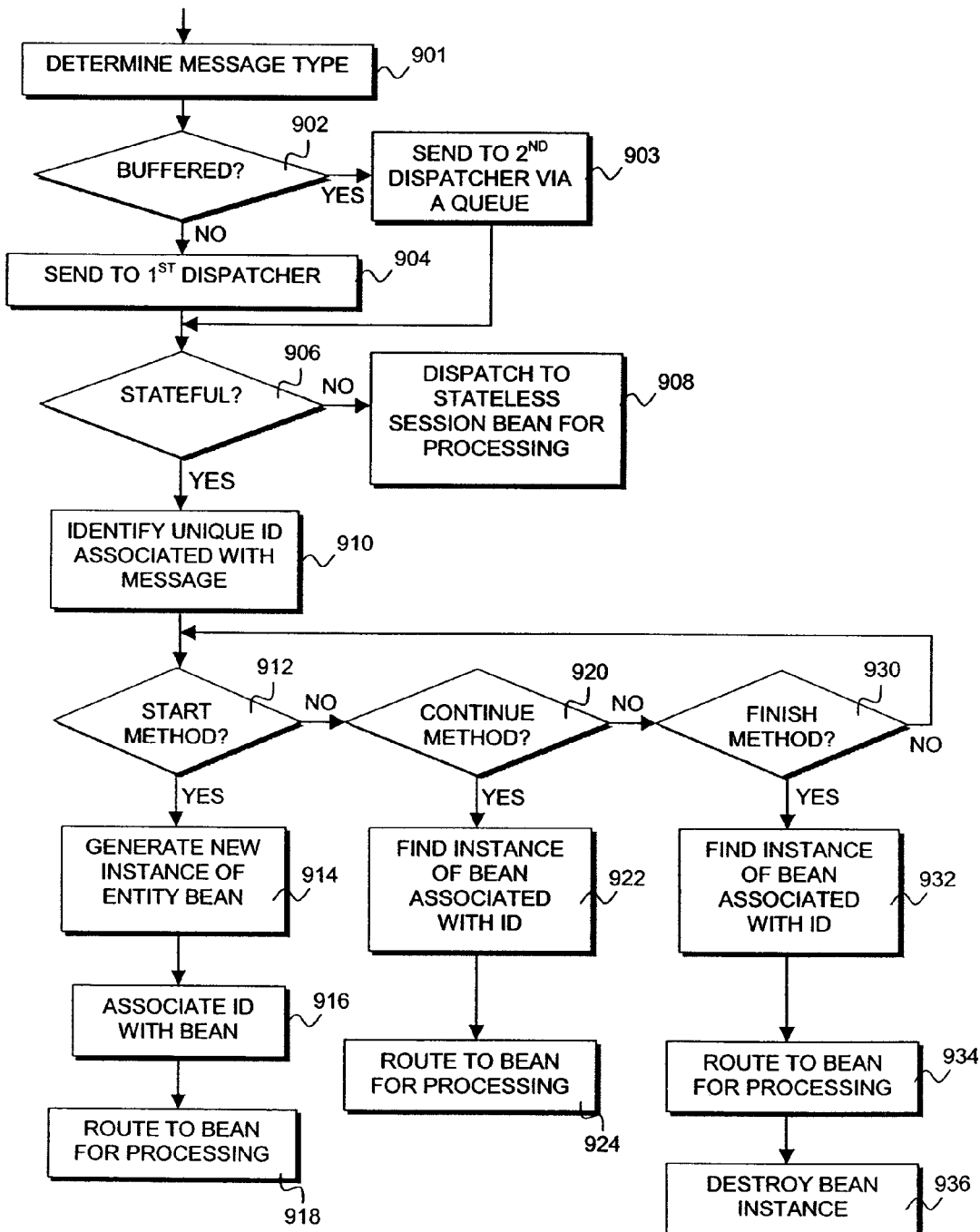
FIG. 9 illustrates one embodiment of the message dispatch process of the enhanced Web service component of FIG. 7.

FIG. 9 illustrates one embodiment of the message dispatch process of the enhanced Web service component of FIG. 7. To begin, the listener servlet determines the method to invoke by e.g. parsing the SOAP message (901). In one embodiment, the listener servlet utilizes the meta-data associated with the method to identify whether the message identifies a buffered or non-buffered method (902). If the listener servlet determines that the message does not identify a buffered method, the listener servlet routes the message to a generic dispatcher 702 (904). If, however, the listener servlet determines that the message identifies a buffered method (902), the listener servlet routes the message to dispatcher 706 by way of queue 704 (903). Next, the selected dispatcher examines the associated meta-data to determine whether the message identifies a stateful or stateless method (906). If a stateless message is identified, the dispatcher routes the message to a stateless session bean for processing by the Web services logic wrapped by the bean (908). If, however, the selected dispatcher determines that the message identifies a stateful method, the dispatcher identifies a unique identifier associated with the message (910). In one embodiment, the unique id is generated by the requesting client device and is encapsulated within one or more SOAP message headers.

The dispatcher then continues to determine whether the message represents a start method (912) a continue method (920) or a finish method (930). If the method represents a start method (912), a new instance of an entity bean containing the Web service logic and conversational state is generated (914), and then associated with the identifier (916). The dispatcher uses the associated meta-data to determine if annotated source code 107 defined a Callback interface and declared a variable of type Callback. If so, a client proxy object for interacting asynchronously with the client is created based on the Callback interface and is assigned to the declared variable. Further, the dispatcher determines whether annotated source code 107 declared one or more variables for interacting with external services. If so, the dispatcher creates proxy objects for interacting with these remote services based on the interfaces defined by the associated service definition (e.g., WSDL) files, and assigns them to the declared variables. Further, the dispatcher configures the Web service to accept all asynchronous callbacks declared in each of the associated service definition (e.g., WSDL) files and route the callbacks to Web service methods named by appending the declared variable name to the callback method name (e.g., mybank_creditCheckResponse(String result)). The dispatcher stores all proxy objects (whether created for interacting with the client or other external services) as part of the conversation state of the entity bean. The message is then routed to the new entity bean instance for further processing by the Web logic.

If the method represents a continue method (920) or finish method (930), the bean instance associated with that identifier is found (922, 932), and the message is routed to that bean for further processing by the Web logic (924,934). With the finish method however, the bean instance is destroyed once the processing has completed (936).

In one embodiment of the invention, once the message has been routed to a bean (whether stateful or stateless), a SOAP handler removes the encapsulated XML message from the SOAP body, determines which method of the Web service logic to invoke based on the root element of the XML message, maps XML child elements onto newly created programming language objects to be used as arguments to the method, and invokes the Web service method passing the newly created objects as parameters. If the invoked Web service method returns a value synchronously, the bean will map the value onto a corresponding XML element, package it in a message and return it to the client using the same protocol details used in the request (e.g., SOAP over HTTP).

Once invoked, any Web service method can use the proxy objects created for generating calls to the client or external services. The proxy objects will map objects passed as parameters into corresponding XML elements and use them and the remote method name to generate and send a message to the remote service or client. In the case of external services, the message is generated and sent using the protocol specifics (e.g., SOAP over HTTP) specified by the associated service description file. In the case of the client, the message is generated and sent using the protocol specifics used by the client in the initial start method. In one embodiment, synchronous responses from the client or remote services are parsed to extract the result and map it onto a representative object, which is returned to the Web service code as the return value of the proxy object method invocation.

Asynchronous responses and requests from external services are dispatched to the appropriate entity bean by the listener servlet and dispatch beans just like requests sent by the client. These responses are routed to the appropriate method of the Web service logic identified by a special naming convention. Specifically, they are routed to methods named by appending the name of the external service out method to the declared service proxy variable name (e.g., mybank_creditCheckResponse(String result)).

Figure 10:
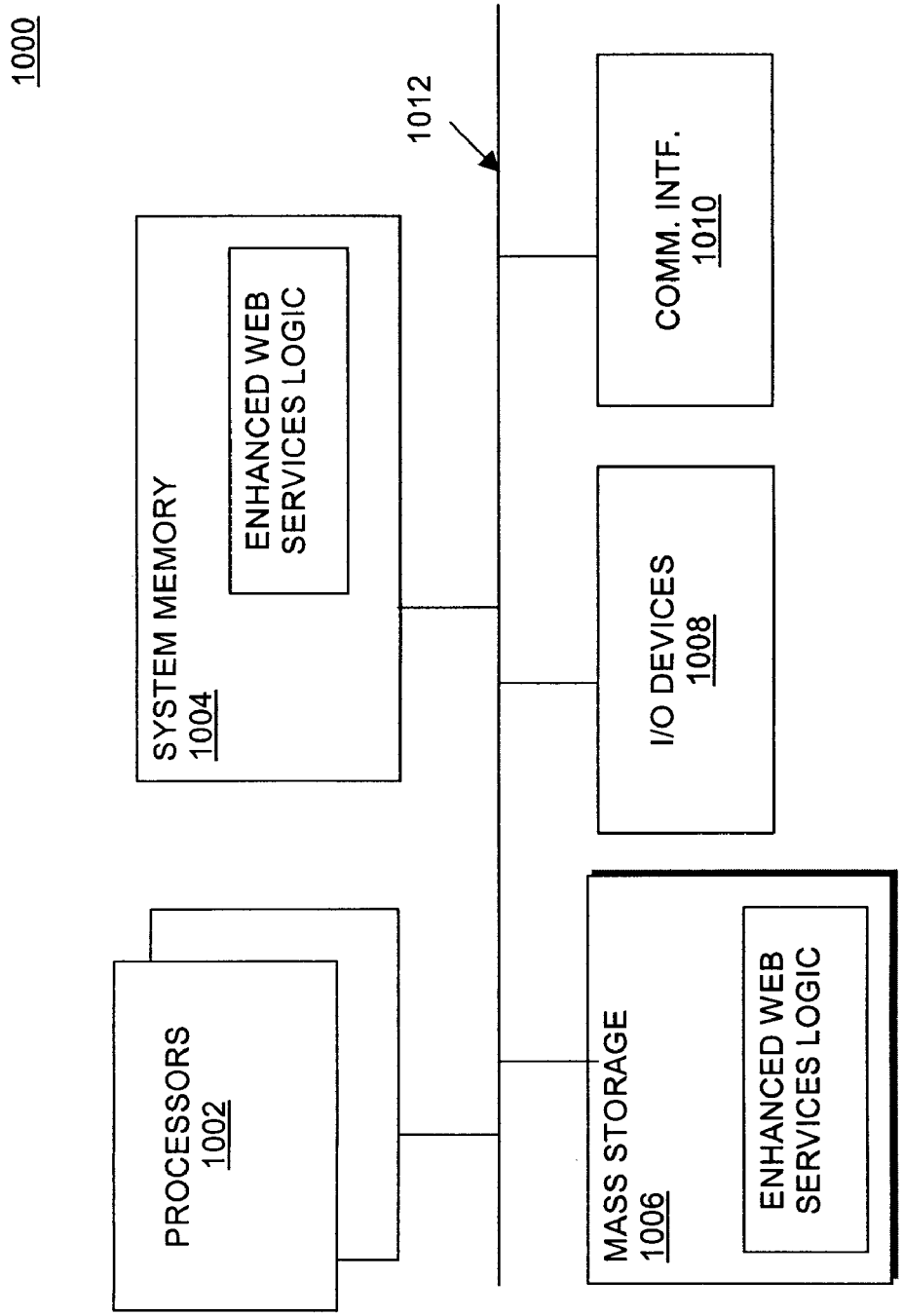
FIG. 10 illustrates an exemplary computer system suitable for hosting Web services development platform of the present invention.

FIG. 10 illustrates an example computer system suitable for hosting Web services development platform of the present invention. As shown, computer system 1000 includes one or more processors 1002, and system memory 1004. Additionally, computer system 1000 includes mass storage devices 1006 (such as diskette, hard drive, CDROM and so forth), input/output devices 1008 (such as keyboard, cursor control and so forth) and communication interfaces 1010 (such as network interface cards, modems and so forth). The elements are coupled to each other via system bus 1012, which represent one or more buses. In the case of multiple buses, they are bridged by one or more bus bridges (not shown). Each of these elements performs its conventional functions known in the art. In particular, system memory 1004 and mass storage 1006 are employed to store a working copy and a permanent copy of the programming instructions implementing the compiler and/or enhanced Web services of the present invention. The permanent copy of the programming instructions may be loaded into mass storage 1006 in the factory, or in the field, through e.g. a distribution medium (not shown) or through communication interface 1010 (from a distribution server (not shown). The constitution of these elements 1002-1012 are known, and accordingly will not be further described Embodiments in accordance with the present invention can use source code annotations to decrease the time, knowledge, skill and ultimately cost required to develop security capabilities into Web services. In some embodiments, developers and system managers can utilize the enhanced compiler to automatically create, deploy, and manage multiple types of security using the source code annotations without requiring knowledge of the specifics of any of these security types. The security can be applied to request messages, callbacks or response messages, or requests and callbacks originating with intermediate services in a chain. The security capabilities supported by the invention are applicable to stateful or stateless services, and both synchronous and asynchronous services. Types of security that can be specified by developers using the invention can include:

Transport security for a data communications channel. These security methods may use established protocols such as SSL.

Message based encryption security to protect headers and payloads in messages.

Authentication of users or computing devices for channel or message based security.

Use of digital signatures to verify the originator of a message. These security methods may use established protocols such as those typically found in SOAP headers.

User identity and declarative role-based security, wherein identity or assigned functional roles are used to grant or deny a user or client device access to a particular service. Allowed roles can be defined for the requestor of a service or a callback or result transmission. The roles of a request can be set to those of the originator or other entity using a "run-as" command. In addition, a mapping from the originator of a request and the roles of intermediate entities in a processing chain can be defined.

Some embodiments can use declared roles to define authorization constraints for operations and external callbacks on Web services they are writing and external services they are using. Some embodiments provide a mechanism to resolve roles defined in an external service to the roles in a local application.

Some embodiments can enable components to "run-as" a static principal, meaning all calls from that component to external services will appear to be from a the static principal (e.g., a single person or system) independent of who actually invoked the action that caused the external call. In some cases, this can be a direct mapping on to the static configuration of run-as defined in the J2EE specification.

Some embodiments enable components to "run-as" the authenticated subject that started a conversation (i.e., instantiated the component). In some cases, role-based constraints can still be applied and will be based on the effective Subject.

Some embodiments enable (possibly via configuration) calls to external services to have external callbacks run-as the Authenticated Subject that started the conversation (i.e., instantiated the component). This is similar to run-as start user, but applied to callbacks. This feature may be used to address the scenario where a conceptually synchronous call is implemented as an external asynchronous request, and the author does not want the external caller's identity (Principal) associated with actions taken within the event handler. Note that in some embodiments, external software components may always run in the context of their container, so run-as may only be applicable to external callbacks to the external service proxy instance. In these cases, since we don't have specific request/response correlation, the options are to:

Bind a static or "start" Subject to all external callbacks.
Bind a static or "start" Subject to external callbacks for a specific external service proxy.

Some embodiments may provide an API to make the authenticated user available. This is useful when the "calling" Principal was set via "run-as".

Some embodiments support declarative security on Callbacks and may also support the ability to bind the Principal that starts a conversation to callback invocation.

Some embodiments may use an approach to role definition that closely parallels that used by J2EE. Roles added to methods are extending privileges downward (adding broader privileges).

Some embodiments may provide a number of additional capabilities including:

Supporting the J2EE security exclude-list element.
Using both new project models in some embodiments of the IDE and platform security plug-ins can enable creation of configurations that grant an appropriate set of roles to developers. This makes it possible to test security early in the development process without making life too complicated for developers and administrators. Roles do not need to be administratively added, changed, or removed at load time.
Providing an ability to configure run-as on proxies to external software entities.

In some embodiments, an annotation such as:
@common:security roles-allowed="<role-name> [ . . . <role-name>]"

declares a space-separated list of role names that are authorized to invoke @operation methods. For example, to be consistent with the EJB specification, the role-name must conform to the lexical rules for an NMTOKEN.

In some embodiments the roles-allowed tag is optional and can be applied at a class level or at a @operation method level. Any roles that are applied at the class level may be applied to all operations (i.e. a class level role-required may exist on each @operation). For example, this is semantically equivalent to using the element <method-name>*</method-name> within an EJB <method-permission>.

During dispatch, the runtime messaging environment may reject any request where:

At least one role name is defined using the roles-allowed attribute on either the class or the @operation method that is the target of the dispatch, and
The calling Principal is not a member of at least one of the roles named in the roles-allowed tag on the class or @operation method.
In some embodiments, if no roles are specified, then the assumption is that all roles are allowed. In some cases this may involve adding the <unchecked/> element to the deployment descriptor (if unchecked is not the container's default behavior).
In some embodiments, an annotation such as:
@common:security callback-roles-allowed="<role-name> [ . . . <role-name>]"

declares a space-separated list of role names that are authorized to invoke callback event handlers in a Web service (for example) or an external software entity. In one example, the rules can be essentially the same as for roles-allowed except that the tag can exist only at the top of a service proxy definition or on methods defined within the Callback interface of a service proxy definition. In some cases the definition of callback security (and other configuration info e.g. handlers, reliability, etc) is in a service proxy definition rather than within the source that implements the operations being constrained.

In some embodiments, the annotation @common:security roles-referenced="<role-name> [ . . . <role-name>]" declares the space separated list of role names that are used as parameters to isCallerInRole(String roleName). This annotation serves two purposes:

J2EE specifications may require it in the underlying implementation.
It provides an indication of what role names are referenced in the code. If a component is delivered in binary form, the role names may need to be mapped to roles in the target application.

In some embodiments this annotation is optional and is only allowed at the class level for various service and proxy definitions. These roles may not imply permission to invoke the operation and should not be considered during dispatch. They may only represent the names of the roles referenced from within the operation.

To simplify administration, some embodiments assume that all roles defined through roles-allowed and callback-roles-allowed may be used within the code. This can imply that only roles reference in code but not part of the declared role must be added via the roles-referenced tag.

In some embodiments, during code-generation, the roles included in roles-allowed and roles-referenced need to be included in the ejb-jar.xml deployment descriptor.

In some embodiments, the annotation @common:security run-as="staticRoleName|<start-user>" provides the means to specify a component to run as a particular user. This annotation is optional and may only allowed at the class level. In an example, this annotation has the same semantics as the EJB run-as mechanism, (i.e. it does not effect the caller's identity, it establishes the identity that the component will use when it makes calls). During code-generation, the role name included in run-as may be included in the ejb-jar.xml deployment descriptor.

The table below givens an example of one possible set of annotations that can be used in some embodiments.

TABLE 1

Exemplary Annotations in Some Embodiments

| Tag (1) | On Class | On Operation Method | On Callback Method | Affects DD |
|---|---|---|---|---|
| Roles-allowed | Y | Y | N | Y (2) |
| callback-roles-allowed | Y | N | Y | Y (2) |
| Roles-referenced | Y | N | N | Y |
| run-as | Y | N | N | Y |

Notes:
(1) These tags are very rarely needed on an external service proxy declaration
(2) All roles included in roles-allowed may be added to the deployment descriptor. This means that only roles referenced but not declared need to be added via the roles-referenced tag.

Figure 11:
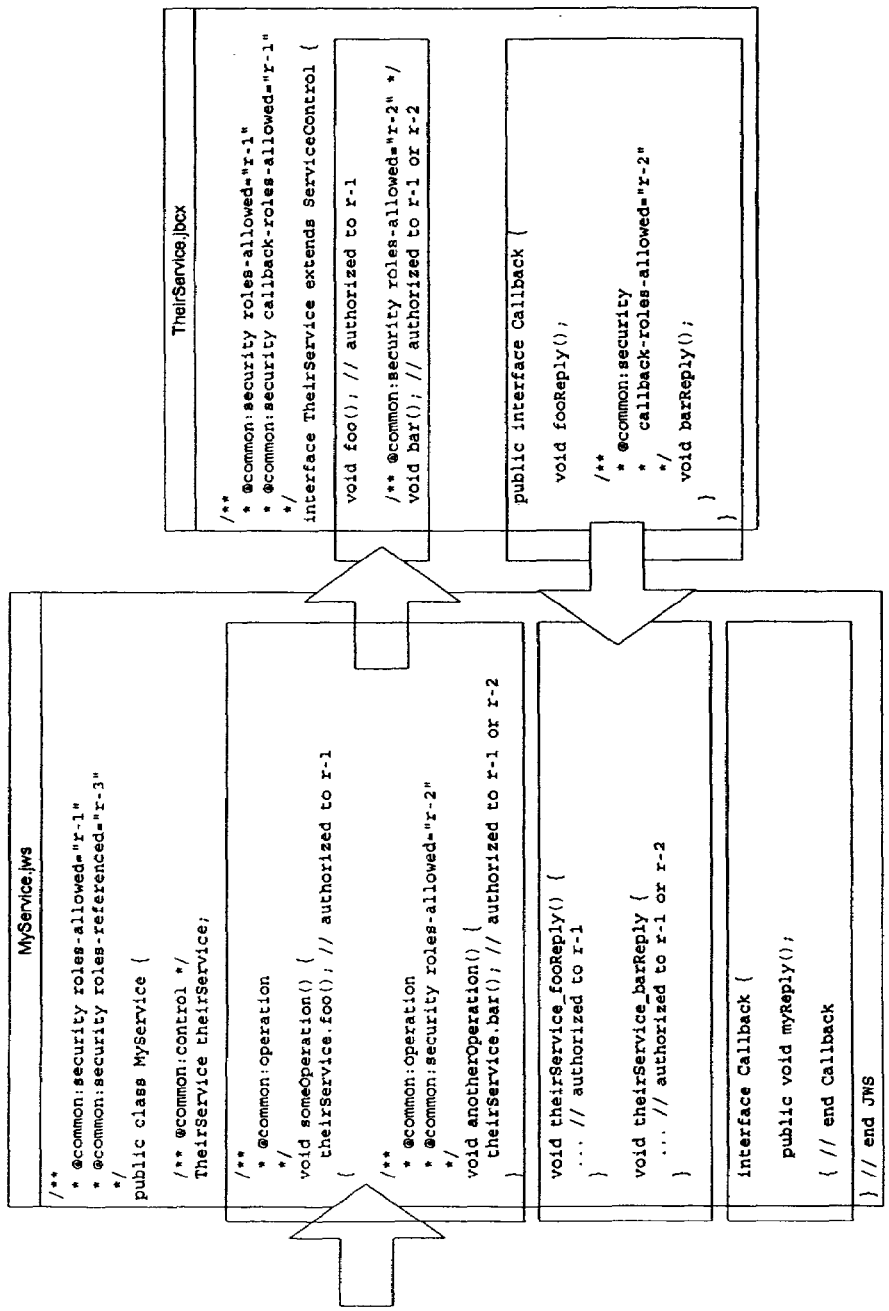
FIG. 11 shows an example of one possible model for role behavior in accordance with one embodiment of the invention.
Figure 12:
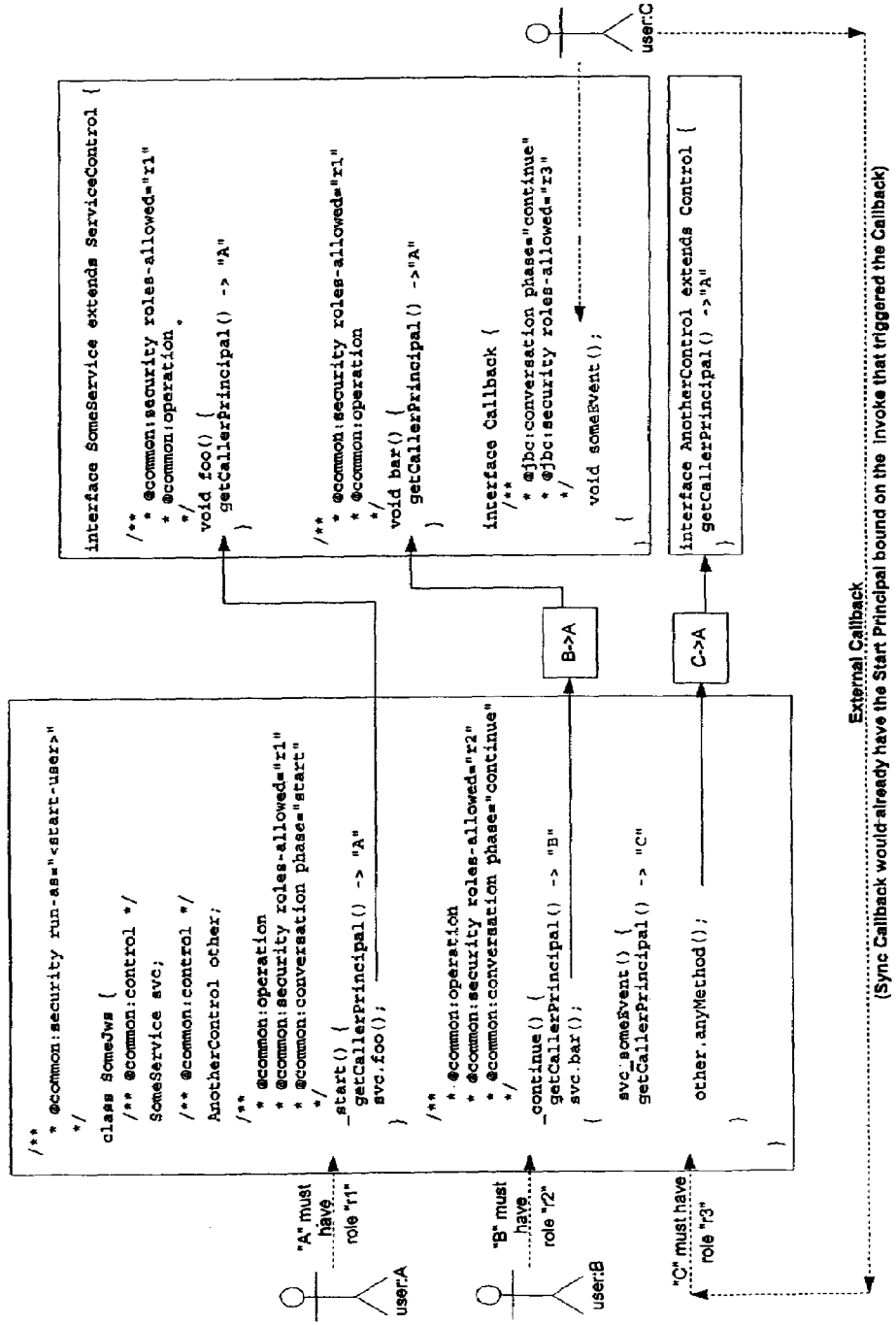
FIG. 12 shows an example of one possible model for the behavior of "run as", which may be used in some embodiments.

FIG. 11 shows an example of one possible model for role behavior and FIG. 12 shows an example of one possible model for the behavior of "run as", which may be used in some embodiments.

In some embodiments, the @common:roles-allowed tag can be used on the @operation methods of, for example, proxy object definition files. Control execution may respect the run-as configured in the hosting component. In these cases, the @common:role-allowed will be evaluated with respect to the run-as principal.

In some embodiments, proxy objects may not be implemented as EJBs, in which case an administration path separate from the standard J2EE approach may be required to administratively modify the security applied to a control.

In some embodiments, the proxy objects may not be implemented as EJBs, in which case a mapping mechanism separate from the one commonly used in J2EE may need to be used to map roles when including externally provided control jars in an application.

In an example, if Web Services Security is a message-based model it can be layered on top of existing J2EE security. From an integration perspective, the key consideration is authentication since message level encryption and signature are not currently relevant to the J2EE runtime.

In some embodiments, when an incoming SOAP message includes WSSE based authentication that subject should be bound to the request rather than any transport provided subject. An exception to this is cases where the service is configured to bind the subject that starts a conversation to subsequent requests.

In some embodiments, there may be cases where a roles-allowed test is not met. Some examples of error responses in these cases include:
  If a SOAP protocol is being used, a SOAP Header Fault can be generated indicating the Client as the cause, otherwise
  An appropriate security exception can be thrown.
  In some embodiments a specific logging category can exist for security related messages, allowing, for example:
    Clearly viewing security related issues.
    Dividing responsibility for security administration.

The following sections show examples of the use of source code annotation to create security services in the form of source code in the Java language. These examples are meant only for purpose of illustration and are not intended to communicate limitations on the functionality or embodiments of the invention. The names of the following section are based on exemplary file names that could be used to identify each segment of source code.

Certain embodiments can use source code annotations to decrease the time, knowledge, skill and ultimately cost required to develop reliable messaging capabilities for Web services. This provides the capabilities for a client and a service to communicate using guaranteed message delivery. In some embodiments, the enhanced compiler automatically creates the required reliable messaging software for selected Web services using the specifications provided by the annotations. A callback path is provided to notify the transmitting entity of delivery failure or time out. The messages traveling from the client are delivered to the service's message queue. Messages traveling from the server are delivered to the client. Developers have the option to set a number of parameters, which can include, the number of retries attempted, the time interval between retries, and the time to live for a message. The reliable messaging capabilities supported by the invention are applicable to both synchronous and asynchronous services.

Some embodiments will use SOAP headers in the underlying implementation. These cases can use a SOAP/HTTP protocol binding, possibly using the capabilities of the runtime messaging infrastructure.

In some embodiments a void return signature may be used for methods transmitting messages in the runtime-messaging environment. Some examples of situations where a void return signature may be advantageous include:
1. If the sender and the receiver both recognized that while the pattern of interaction was request/reply, the amount of time that it would take to generate the response was longer than either party would want to hold open a physical connection.
2. If the receiver was accessible only via a queue, then getting the response back to an endpoint in the servlet container introduces technical issues.

Some examples of annotations that may produce methods with void return signatures when compiled include:
  @operation that was marked "buffered"
  @operation that had a JMS protocol binding (XML or SOAP)

Some embodiments of the invention will consider a message as having been successfully delivered when it is placed in the queue or queues for the one or more target services. This means that "acknowledgment" indicates that the message was delivered to the Service's queue, not the Service itself. A number of possible scenarios could result in the message never being delivered to the destination Service. Some embodiments may use J2EE platforms, in which case the server side integration can use the facilities of JMS.

Some embodiments will include extensions to the design of the queue delivery model, which can include:
  Pull messages from the target services error queue to know that the delivery of the message was unsuccessful.
  Provide a response path back from the target service that would indicate the message had been delivered (i.e. a delivery receipt queue).

Some embodiments may provide the capability to put messages submitted to the queue or directly to the service a predetermined order within the reliable messaging infrastructure. In some cases this capability may be desired to reduce the requirement to retransmit a sequence of messages if they do not arrive a required order.

Using the reliable messaging facilities, client software can be assured of message delivery to one or more queues or directly to one or more services. Some embodiments will provide delivery, which is transparent from the point of view of the client, to the remote service queue. Thus, the client software does not need to be modified to use the reliable messaging infrastructure. In some embodiments, the client can receive an invocation error if the message cannot be en-queued by the local message handling service. This can be made to appear to the client like any other resource error. In some embodiments, the client will receive an error event if the message cannot be delivered to the remote service queue.

The remote messaging system can provide client software with a number of benefits, which can include:
- The ability to transitionally en-queue the message for remote delivery. For example this capability can be implemented by providing JMS semantics to the client while using HTTP as a transport.
- Redelivery or retransmission attempts can be handled by the underlying message handler (i.e. intermittent network errors are handled transparently).

Using reliable messaging facilities, server software can provide assured message delivery to one or more queues or directly to one or more services. Several key capabilities of for servers have already been discussed.

Some embodiments may provide "Blocking on Delivery" capabilities. In this case, the reliable messaging system can block the invocation pending delivery confirmation from the remote server or queue. Note that this still does not ensure receipt by the destination Service. It's not clear how this could be easily accomplished as part of a transactional operation.

Some embodiments of the invention additional error notification capabilities. In these cases, reliable messaging system can deliver failure notification up to the point the message is delivered to the remote service implementation.

Some embodiments can provide "Delivery Receipt Notification" capabilities. In these cases, the reliable messaging system provides delivery receipts if there are corresponding paths build on the server side.

Some embodiments can provide the caller's control ID as part of the context delivered to the local service. This capability allows the reliable messaging system to provide callbacks the "sending" components.

Some embodiments of the invention can have a constraint on the number of outstanding send operations. In some cases, a sender may only have a single outstanding send, possibly making the programming model is simpler since the caller knows what context the error is related to. In cases where multiple outstanding operations are allowed, an API can be provided, similar to ones typically used for exception handling, which provides the context back to the caller. In some cases, the number of messages allowed to be outstanding can be configurable.

In cases where the reliable messaging system ensures delivery to a queue, the receiving service may not be aware that the message was delivered reliably. The server side message handling service will en-queue the message to a queue, possibly after verifying that is it not a duplicate. Some embodiments will implement this functionality using the capabilities provided by JMS.

Figure 13:
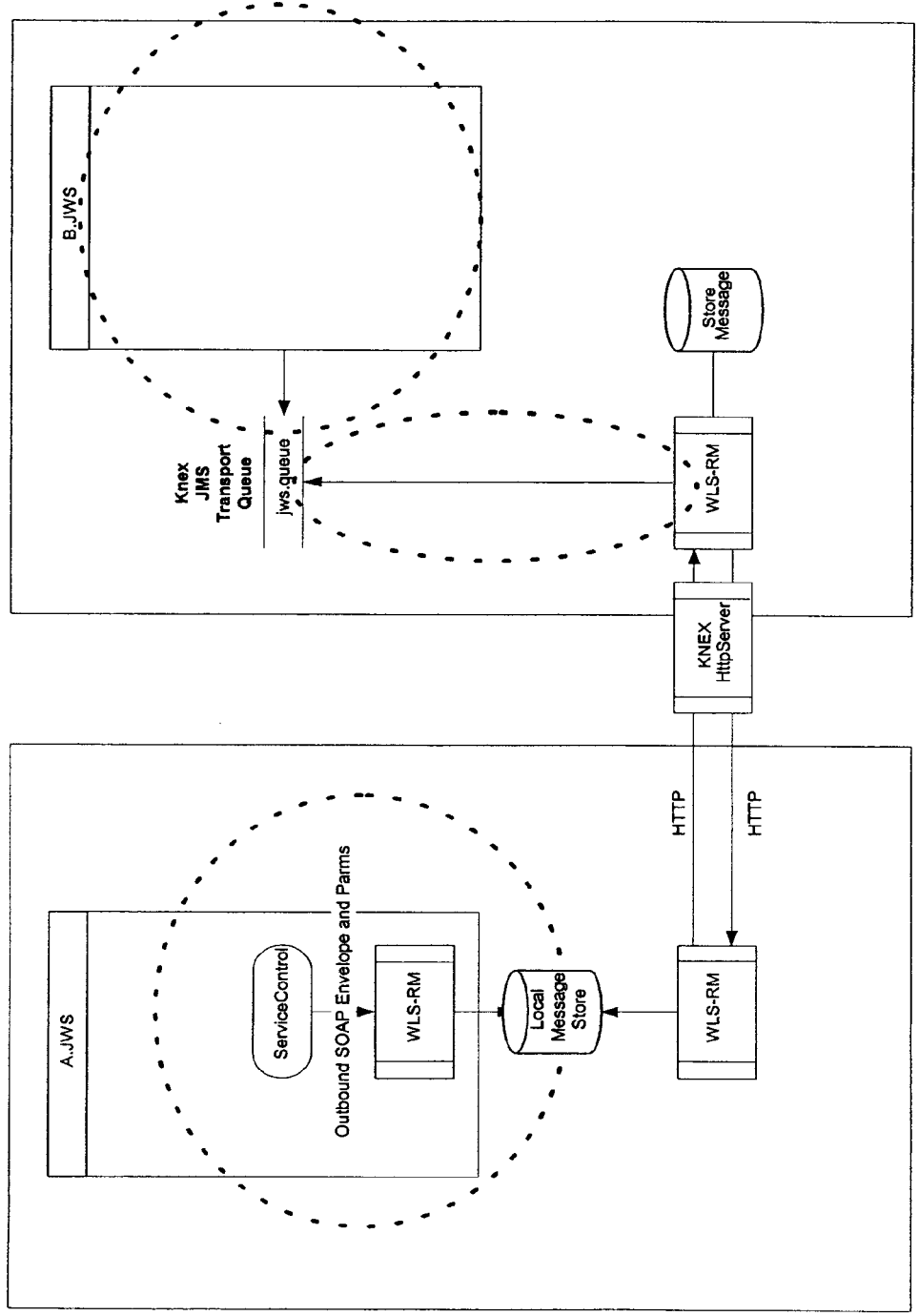
FIG. 13 illustrates the key elements of a processing model for reliable message delivery, which may be used in some embodiments of the invention.

FIG. 13 illustrates the key elements of a processing model for reliable message delivery, which may be used in some embodiments of the invention. This particular model uses a void operation and is implemented using JWS, and thus there are three distinct transactions:
- The local JWS @operation method.
- The remote message service handling and delivery to the service queue.
- The remote JWS @operation method.

Some embodiments will use platform capabilities to established a Map based API that can be used to pass the necessary information from the run time environment to the reliable messaging. This Map needs to be populated with information that the runtime messaging knows (via annotations) about reliability requirements for each @operation or callback.

In some embodiments, the ServiceControl will pass the following information to the reliable messaging system, the entire outbound SOAP message as an XML Stream and parameters in the SAAJ Format
- The Control Id of the sending Control
- The Conversation Id
- The phase of the Conversation (start continue finish)
- HTTP transport related parameters (Endpoint URL, proxy)
- Security Context with credential mapping before calling the reliable messaging system.
- Certificate or path to Certificate for client cert SSL
- UserId/Password
- Security Token In some embodiments, the reliable messaging system will add the appropriate SOAP Headers and en-queue the request locally.

In some embodiments this case, the reliable messaging system can notify the caller that a delivery failure occurred. ebXML Defines an Error Reporting and Handling model that may be used as a framework for communicating failures, including:
- ValueNotRecognized
- NotSupported
- Inconsistent
- OtherXml
- DeliveryFailure
- TimeToLiveExpired
- SecurityFailure
- Unknown In some embodiments, when the runtime massaging infrastructure HTTP Server receives an inbound message it can forward the incoming stream to the reliable messaging system library if the message is being delivered "reliably". In some cases the runtime messaging infrastructure can either look in the SOAP header or have to look far enough into the body to know which operation is being called, then look up that operation's metadata.

Figure 14:
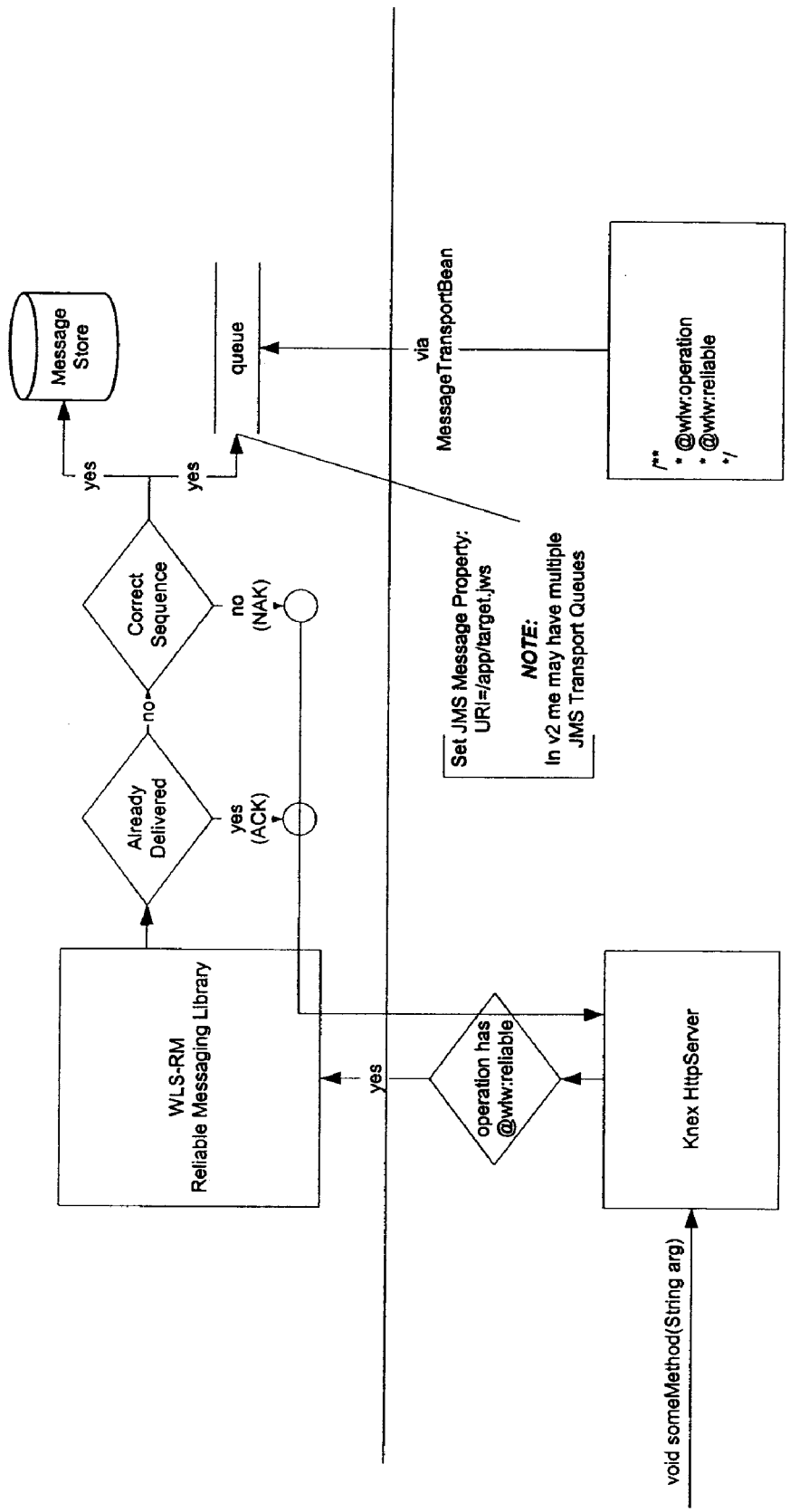
FIG. 14 illustrates an exemplary overall processing model in the server side, which may be used in some embodiments of the invention.

FIG. 14 illustrates an overall processing model in the server side. In some embodiments, the parameters that need to be provided to reliable messaging system include:
- The URI of the Service, which can be a Map of Properties to set on the JMS Message.
- The reliability parameters for the targeted operation
- The conversation ID
- The JMS Queue Connection information for the target Service (JNDI Connection Factory, JNDI Queue, etc).

In some embodiments, the reliable messaging system needs to return the response message (as an XML Stream) to the runtime messaging infrastructure HTTP Server. Only the reliable messaging system knows what headers are necessary to communicate with the sending reliable messaging system.

In some embodiments, if an error occurs during the invocation of the reliable messaging system library, runtime-messaging infrastructure can return a HTTP 500 processing error. The reliable messaging system will perform any appropriate retry logic.

If reliable messaging system is provided an XML stream that it can't handle, then it may throw an appropriate exception. The runtime messaging infrastructure may translate that exception to a SOAP fault and return it in the HTTP response. Some embodiments may include Fault Mapping capabilities.

Some embodiments allow attributes to the reliable messaging annotations (i.e. the @wlw:reliable tag) which, depending on the details of the embodiment:

May only be applied to an @operation method or callback. If the tag is defined in at file level, it may define the default processing for all operations in the file. For example, if the @wlw:reliable tag is defined on an @operation, it may override the @wlw:reliable tag defined at the top of the file.

Some possible examples of attributes to the annotation tag can been seen in the table below:

TABLE 2

Exemplary Attributes to the Annotation Tag in An Embodiment

| @wlw:reliable attributes | Type/Defaults | Description | In WSDL |
|---|---|---|---|
| Retries | integer count (No default) | Number of times the client should attempt to re-deliver an unacknowledged message. [Mutually exclusive to retry-interval and persist duration] | Y |
| Retry-interval | integer seconds (No default) | Minimum time the client should wait before the client attempts to re-deliver an unacknowledged message. | Y |
| message-time-to-live | integer seconds (No default) | Indicates the duration in seconds for which the sever will persist reliably delivered messages. Used by the client to determine if a message has expired. | Y |
| in-order | (true [default]\|false) | Indicates that the messages must be delivered in the order sent. | Y |

The following sections show test criteria, which may be applied to some embodiments.

No errors path

Force retry of send

Force duplicate (verify duplicate removal at target system)

Changing a parameter that reduces the responsibility of the server. (e.g. reduce message-time-to-live).

Verify that failure event is delivered to the calling application when:

Local configuration failure

Local reliable messaging delivery failure

Invalid local reliable messaging configuration

Invalid remote target configuration

Remote system unreachable

Remote reliable messaging delivery failure to Queue

Changing a parameter that increases the responsibility of the server (e.g. increase message-time-to-live).

Embodiments can use source code annotations to decrease the time, knowledge, skill, and ultimately cost required to develop message interception and transformation capabilities for Web services. Interceptors can provide the means for developers to apply their own pre and post processing methods to Web service messages. The use of interceptors allows developers to add functionality that doesn't exist in default message processing supplied by transactional platforms, Web servers and other standard software infrastructure. These manipulations can include transformation of message headers and contents, logging, auditing, message redirection, and protocol conversions. Embodiments allow a developer to utilize the enhanced compiler to automatically generate a software component using source code annotations to implement an interceptor, having the required message interception and transformation capability. The interceptor capabilities supported by the invention can be applicable to stateful or stateless services, and both synchronous and asynchronous services. The capabilities of embodiments can include:

Interceptors can be applied to messages traveling to or from one or more Web services.

Interceptors can be "attached" to one or more Web services.

Interceptors can provide arbitrarily complex message processing as defined by the developer.

Interceptors can be arbitrarily concatenated.

Interceptors can transform both the header and payload of messages or apply no transformation at all.

Interceptors can arbitrarily redirect the message to one or more clients or services.

Interceptors can be applied to commonly used protocols (i.e. SOAP messages) or to specialized or emerging protocols.

When interceptors are used, required WSDL or other service directories entries are created automatically at compile time.

Interceptors can implement a streaming model for parsing, processing and retransmitting messages to both improve performance and reduce transmission delay.

The interceptors created by developers using the invention can have many properties including:

The interceptors can have access to the entire message payload and header.

The interceptor annotations support standard protocols and message structures as built-in capabilities (e.g. SOAP-Header or envelope, SOAP-Body, Attachments, etc).

The interceptor implementation may change, replace, or do nothing to the contents of the message payload.

Resulting messages can conform to the WSDL or other service directory protocols and formats for inbound and outbound messages.

In some embodiments interceptors are able to read, process and retransmit file attachments to a message. In some cases the API can be the SAAJ API (or a subset) to provide access to attachments.

Some embodiments may employ interceptor implementations with dependencies on w3c XML APIs. In some embodiments a Java XBean API is converted to a w3c API. For example, the basic scenario could use toString( ) and parse into a DOM.

Some embodiments can make use of the JAX-RPC API, which defines a handler model that has the same basic features useful in creating interceptors. Since the JAX-RPC model is well understood by experienced developers, may make the interceptor API consistent (at a semantic level) with JAX-RPC API where similar features are required.

Some embodiments can use a streaming XML parser and API. For some of these embodiments the API are structured around a pull rather then push model for parsing. These embodiments may use the push model parser to improve the performance, especially for streaming implementations. In some cases the Java XMLInputStream API can be used. In some of these cases the XMLInputStream can be used to construct a DOM if needed. FIG. 15 shows an interceptor API, which may be used in implementing some embodiments of the invention.

Once the complier has created the interceptor it is deployed into the runtime environment. Once in the runtime environment the interceptor becomes operational.

Each interceptor in the runtime environment will follow some particular lifecycle. Some embodiments may pattern the interceptor lifecycle model after the lifecycle model defined for JAX-RPC Handlers. In some cases the JAX-RPC handler API is used directly. This model can give the lifecycle and the environment specific characteristics including:

The interceptor may have a public no-arg constructor.

The interceptors may have their init( ) method called before any messages are delivered to the interceptor.

An interceptor implementation may be attached to multiple Service Types (e.g. Port Type). In some embodiments the interceptor instance is bound to a specific service.

In some embodiments, calls to an interceptor may be serialized by the runtime environment. This approach has the advantage for eliminating the need to make the interceptors type safe.

Some embodiments will use interceptors that only hold initialization state. That is, the state of the interceptor is not changed depending on the message processing.

Some embodiments will employ interceptors that may have their destroy( ) method called when the runtime determines that the interceptor instance will no longer be used. In these cases the interceptor's "handle" methods should not be called after destroy( ) has been called.

In some embodiments the annotations can be used to specify the binding or attaching of an interceptor to one or more services.

Each interceptor in the runtime environment will have a particular state at any point in time. Some possible state management model properties may include:

In some embodiments, interceptors may not hold message related state across invocations. This approach leaves the runtime is free to select a different interceptor instance to process the return (or fault) path of a message.

In some embodiments, the interceptors may acquire and hold state during the init( ) method. In some cases, this state may not be related to a specific message. In some cases, any state acquired during init( ) is specific to the service being configured.

State MAY be shared between interceptors for the processing of a single message request and response. Sate related to the processing of a message MUST be stored in the Message Context. The runtime MUST use the same Message Context instance for the processing of the request and response (or fault).

As has been mentioned previously, interceptors can be chained in an arbitrary manner. Some embodiments employ the JAX-RPC Handler model to provide a mechanism for chaining handlers together forming a message processing "pipeline". In some cases the model will follow the JAX-RPC convention, which specifies that the default order of handler invocation is the order in which the handlers are registered. Some embodiments using this type of model can also provides for specialized chaining based on several convenient conventions including:

Using the SOAP header processing model.

Creating specialized Handler Chain implementation(s).

Using an XML configuration file, possibly based on JSR-109, to define the chaining configuration.

Some embodiments may include the runtime environment capabilities to use a specific category to log the initialization, entry, and exit of interceptor chains. Some of these embodiments may provide consistent levels defining summary and detailed logging information. The logs created may be used to audit transactions in the system, behavior of the system or performance of the system.

Some embodiments use a run time environment with the capabilities to supply interceptors with the required data from one or more WSDL directories or other service directories. This information can be used configure the interceptor if required.

Some embodiments may use information in the message payload to bind security credentials to the current request (perhaps using existing APIs) for messages processed by an interceptor.

In some embodiments developers can use the capabilities of the IDE to indicate that they want to include or exclude interceptors as a debug breakpoint. This is particularly useful for interceptors that are provided through a library.

In some embodiments the IDE will include a project model that can be expanded to build and include interceptors as part of building a Web Service. In some embodiments the IDE can treat the interceptors as a library. This may be particularly useful in cases where the interceptors can be added to existing Web services.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, service, container, event, control, class, object, bean, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer readable media having instructions stored thereon that, when executed by a processor causes the processor to provide a network-accessible service using an integrated development environment, the instructions comprising:
   an annotated source code, which is a programming language augmented with declarative meta-data that exposes program logic as a network-accessible service;
   at least one deployed service component that provides the network-accessible service to a client; and
   an enhanced compiler that analyzes the annotated source code, recognizes numerous types of meta-data annotations, and generates a mechanism, which can include one or more of: object files, software components and deployment descriptors, to facilitate the deployment of the at least one service component, wherein the enhanced compiler operates to automatically create, deploy and manage at least one security type using a specification provided by the annotated source code, wherein the at least one security type is applied to at least one of: request messages, callbacks, response messages, and requests and callbacks originating with an intermediate service in a chain;
   wherein the annotated source code comprises a list of one or more roles, and the automatically created security type comprises role based security that is limited to the one or more roles;
   wherein the annotated source code further comprises annotations that, when compiled by the enhanced compiler, automatically generates reliable messaging capabilities for the network-accessible service, and message interception and transformation capabilities for the network-accessible service;
   wherein the reliable messaging capabilities provide guaranteed message delivery between a client and the network-accessible service, and the message interception and transformation capabilities provide for the application of at least one user defined pre and post processing method to messages providing added functionality that does not exist through default message processing.

2. The computer readable media according to claim 1, wherein:
   the network-accessible service is a Web service.

3. The computer readable media according to claim 2, wherein:
   the at least one service component comprises a servlet container and an enterprise server-side managed component container, which are coupled together to deploy a Web service.

4. The computer readable media according to claim 3, wherein:
   the servlet container comprises:
   listening and responding to a service request from the client; and
   identifying and queuing the service request to be buffered.

5. The computer readable media according to claim 3, wherein:
   the enterprise server-side managed component container dispatches a service request based on meta-data to a stateless or stateful component.

6. The computer readable media according to claim 1, wherein:
   the network-accessible service simultaneously manages multiple transactions, wherein each transaction can be a conversation of a request and/or a response from the client for the network-accessible service.

7. The computer readable media according to claim 6, wherein:
   the network-accessible service manages multiple asynchronous transactions, wherein within each asynchronous transaction, the response may be temporally separated from the initiating request for the network-accessible service from the client.

8. The computer readable media according to claim 1, the instructions further comprising:
   the integrated development environment (IDE) facilitating a graphical interface-based design and deployment of the network-accessible service and providing an indicator to include or exclude interceptors as a debug breakpoint.

9. The computer readable media according to claim 1, wherein:
   the annotated source code is object oriented programming language based.

10. The computer readable media system according to claim 1, wherein:
    the meta-data can be either in-file with the annotated source code, or in a separate file, which can be a specially formatted XML file.

11. The computer readable media according to claim 1, wherein:
    the annotated source code facilitates access to an external service, which can be one of stateful, stateless, synchronous, and asynchronous.

12. The computer readable media according to claim 1, wherein:
    the annotated source code defines a wire binding between the network accessible service and a physical wire format and/or protocol.

13. The computer readable media according to claim 12, wherein:
    the wire binding can be at least one of:
    SOAP over HTTP or SMTP;
    transport of XML via generic HTTP Post;
    transport of XML over other protocols such as FTP and mail;
    and transport of XML over messaging services such as JMS or MSMQ.

14. The computer readable media according to claim 1, wherein:
    the at least one security type is comprised of at least one of:
    transport security for a data communications channel;
    message based encryption security to protect headers and payloads in messages;
    authentication of users or computing devices for channel or message based security;
    digital signatures for verifying the originator of a message; and
    user identity and declarative role-based security for granting or deny a client access to a particular service.

15. The computer readable media according to claim 1, wherein:
    the at least one processing method comprises at least one of:
    interception and transformation of message headers and contents;
    message logging and auditing;
    message redirection; and
    protocol conversion.

16. A computer-enabled method to provide a network-accessible service using an integrated development environment, comprising:

exposing program logic as a network-accessible service using an annotated source code, which is a programming language augmented with declarative meta-data;

providing the network-accessible service to a client via at least one deployed service component; and analyzing the annotated source code, recognizing numerous types of meta-data annotations, and generating a mechanism that comprises one or more of: object files, software components and deployment descriptors, to facilitate the deployment of the at least one service component;

automatically creating, deploying and managing at least one security type using a specification provided by the annotated source code, wherein the at least one security type is applied to at least one of:

request messages, callbacks, response messages, and requests and callbacks originating with intermediate services in a chain;

wherein the annotated source code comprises a list of one or more roles, and the automatically created security type comprises role based security that is limited to the one or more roles;

wherein the annotated source code further comprises annotations that, when compiled by the enhanced compiler, automatically generates reliable messaging capabilities for the network-accessible service, and message interception and transformation capabilities for the network-accessible service;

wherein the reliable messaging capabilities provide guaranteed message delivery between a client and the network-accessible service, and the message interception and transformation capabilities provide for the application of at least one user defined pre and post processing method to messages providing added functionality that does not exist through default message processing.

17. The method according to claim 16, wherein:
the network-accessible service is a Web service.

18. The method according to claim 17, further comprising:
listening and responding to a Web service request from the client; and
identifying and queuing the Web service request to be buffered.

19. The method according to claim 17, further comprising:
dispatching a Web service request based on meta-data to a stateless or stateful component.

20. The method according to claim 16, further comprising:
simultaneously managing multiple transactions, wherein each transaction is a conversation of a request and/or a response from the client for the network-accessible service.

21. The method according to claim 20, further comprising:
managing multiple asynchronous transactions, wherein within each asynchronous transaction, the response may be temporally separated from the initiating request for the network-accessible service from the client.

22. The method according to claim 16, further comprising:
facilitating a graphical interface-based design and deployment of the network-accessible service.

23. The method according to claim 16, further comprising:
facilitating access to an external service that comprises at least one of stateful, stateless, synchronous, and asynchronous.

24. The method according to claim 16, further comprising:
defining a wire binding between the network-accessible service and a physical wire format and/or protocol.

25. A machine readable medium having instructions stored thereon that when executed by a processor cause a computer-enabled system to function as an integrated development environment comprising:

expose program logic as a web service using an annotated source code, which is a programming language augmented with declarative meta-data;

provide the web service to a client via at least one deployed service component; and analyze the annotated source code, recognizing numerous types of meta-data annotations, and generating a mechanism, which includes at least one of: object files, software components and deployment descriptors, to facilitate the deployment of the at least one service component;

automatically create an interceptor using a specification provided by the annotated source code, wherein the interceptor allows at least one user-defined pre or post processing method to be applied to a message from the client providing added functionality that does not exist through default message processing, wherein the interceptor is configured to transform message headers and content between the client and the deployed service component;

wherein the annotated source code comprises a list of one or more roles, and automatically creating security type comprising role based security that is limited to the one or more roles;

wherein the annotated source code further comprises annotations that, when compiled by the enhanced compiler, automatically generates reliable messaging capabilities for the web service, wherein the reliable messaging capabilities provide guaranteed message delivery between a client and the web service.

* * * * *

UNITED STATES PATENT AND TRADEMARK OFFICE
CERTIFICATE OF CORRECTION

PATENT NO. : 7,707,564 B2
APPLICATION NO. : 10/784492
DATED : April 27, 2010
INVENTOR(S) : Kyle Marvin et al.

Page 1 of 1

It is certified that error appears in the above-identified patent and that said Letters Patent is hereby corrected as shown below:

On the Title page,
On page 3, Item (56), under "Other Publications", line 24, delete "Interoperabillity" and insert -- Interoperability --, therefor.

On page 3, Item (56), under "Other Publications", line 22, delete "Programing" and insert -- Programming --, therefor.

In column 2, line 8, after "invention" insert -- . --.

In column 14, line 29, after "described" insert -- . --.

In column 18, line 40, after "SOAP)" insert -- . --.

Signed and Sealed this
Twelfth Day of April, 2011

David J. Kappos
*Director of the United States Patent and Trademark Office*